United States Patent [19]
Fujinami et al.

[11] Patent Number: 5,261,100
[45] Date of Patent: Nov. 9, 1993

[54] METHOD OF SOFTWARE DEVELOPMENT

[75] Inventors: Tsutomu Fujinami, Kawasaki; Hirohide Haga, Kyoto, both of Japan

[73] Assignee: Hitachi, Ltd., Tokyo, Japan

[21] Appl. No.: 363,509

[22] Filed: Jun. 8, 1989

[30] Foreign Application Priority Data

Jun. 10, 1988 [JP] Japan .................. 63-144526

[51] Int. Cl.⁵ .......................................... G06F 15/40
[52] U.S. Cl. ...................... 395/700; 395/650; 395/919; 395/922; 364/DIG. 1; 364/275.1
[58] Field of Search ............ 364/200, 900; 395/600, 395/650, 700, 919, 922

[56] References Cited

U.S. PATENT DOCUMENTS

| | | | |
|---|---|---|---|
| 4,330,822 | 5/1982 | Dodson | 364/200 |
| 4,734,854 | 3/1988 | Afshar | 364/200 |
| 4,809,170 | 2/1989 | Leblang et al. | 364/200 |
| 4,827,404 | 5/1989 | Barstow et al. | 364/200 |
| 4,833,641 | 5/1989 | Lerner | 364/900 |
| 4,860,204 | 8/1989 | Gendron et al. | 364/300 |
| 4,949,253 | 8/1990 | Chigira et al. | 364/200 |
| 4,956,773 | 9/1990 | Saito et al. | 364/200 |
| 4,974,160 | 11/1990 | Bone et al. | 364/200 |
| 5,005,119 | 4/1991 | Rumbaugh et al. | 364/200 |
| 5,084,813 | 1/1992 | Ono | 395/1 |
| 5,101,491 | 3/1992 | Katzeff | 395/500 |
| 5,123,103 | 6/1992 | Ohtaki et al. | 395/600 |

OTHER PUBLICATIONS

Shi-Kuo Chang, IEEE Software, vol. 4, pp. 29-39, Jan. 1987.
Interactive Programming Environments, Barstow et al. 1984 pp. 370-413.
Komiya, et al., "Automatic Programming by Fabrication of Reusable Program Components", *Information Processing*, vol. 28, No. 10, 1987, pp. 1329-1345.

Primary Examiner—David L. Clark
Assistant Examiner—John Loomis
Attorney, Agent, or Firm—Fay, Sharpe, Beall, Fagan, Minnich & McKee

[57] ABSTRACT

A program data managing apparatus comprising memories for storing as program data a source code, technique data on a process for making the source code, and intention data on intention to make the source code; a link indicative of the mutual relationship between program data; a display for displaying the relationship between the program data using the link; a link provided to indicate the relationship between a newly developed source code and the original program data from which the new source code derives; and a display for displaying the source code developed stepwise by that link and the related program data.

18 Claims, 33 Drawing Sheets

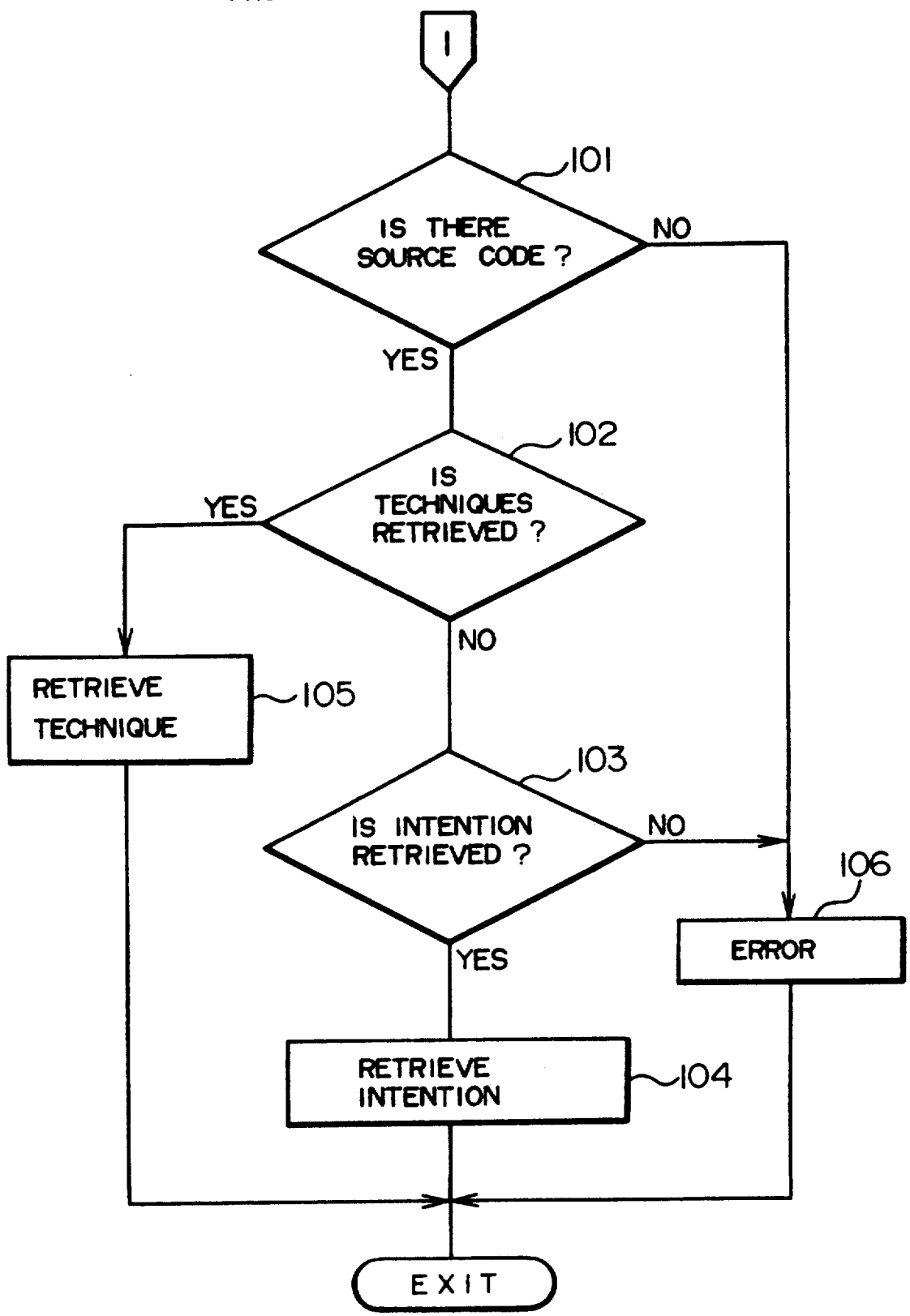

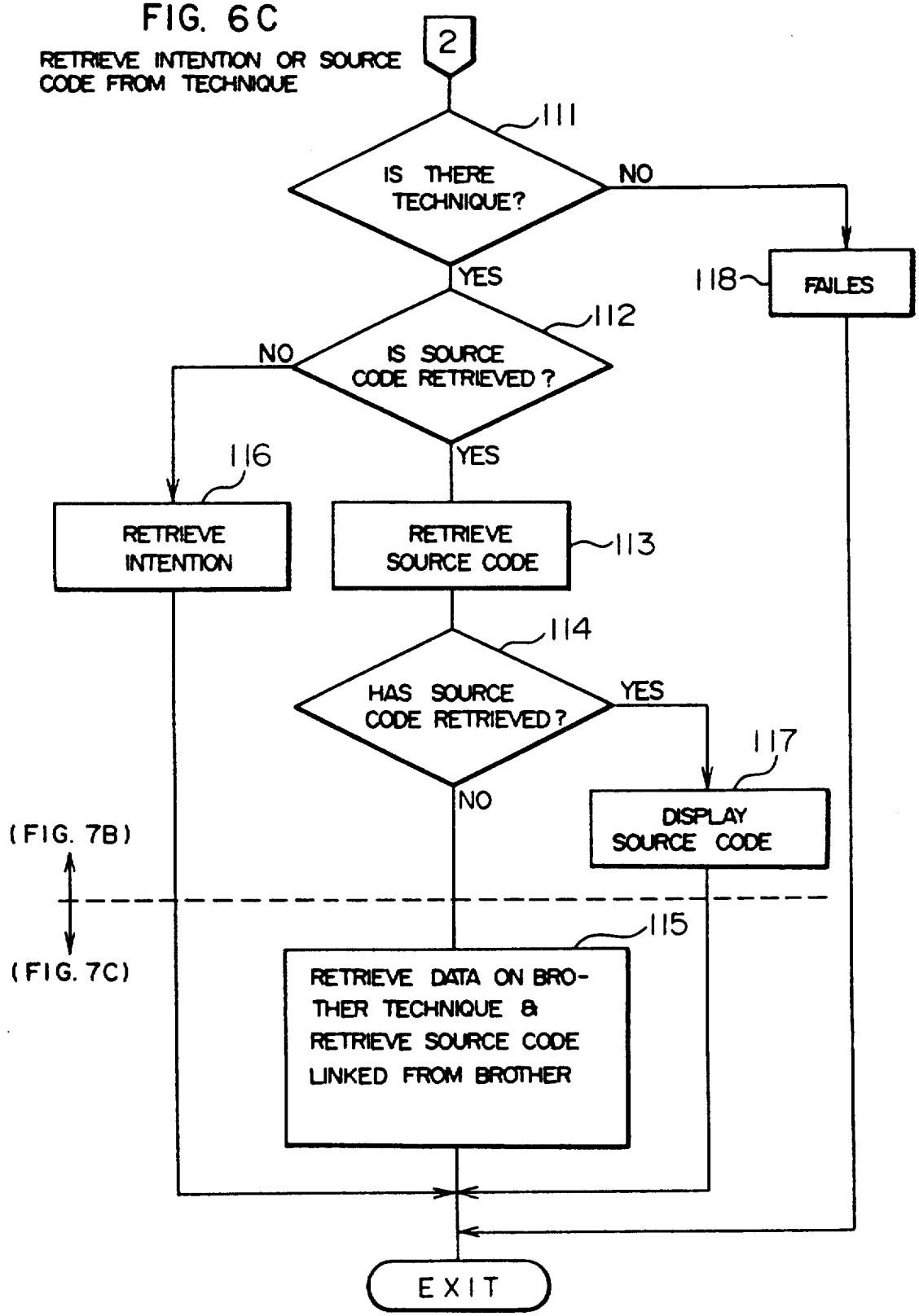

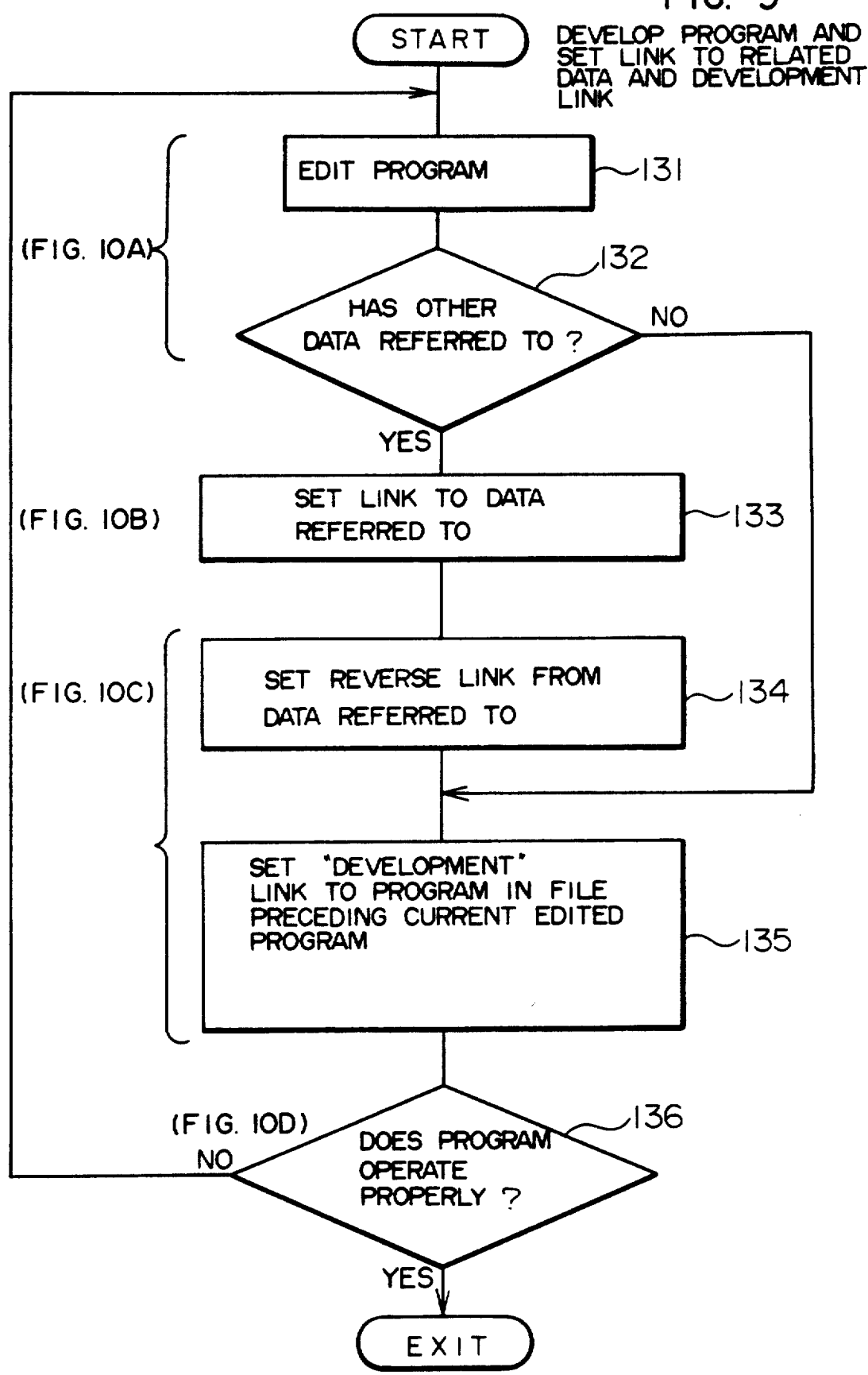

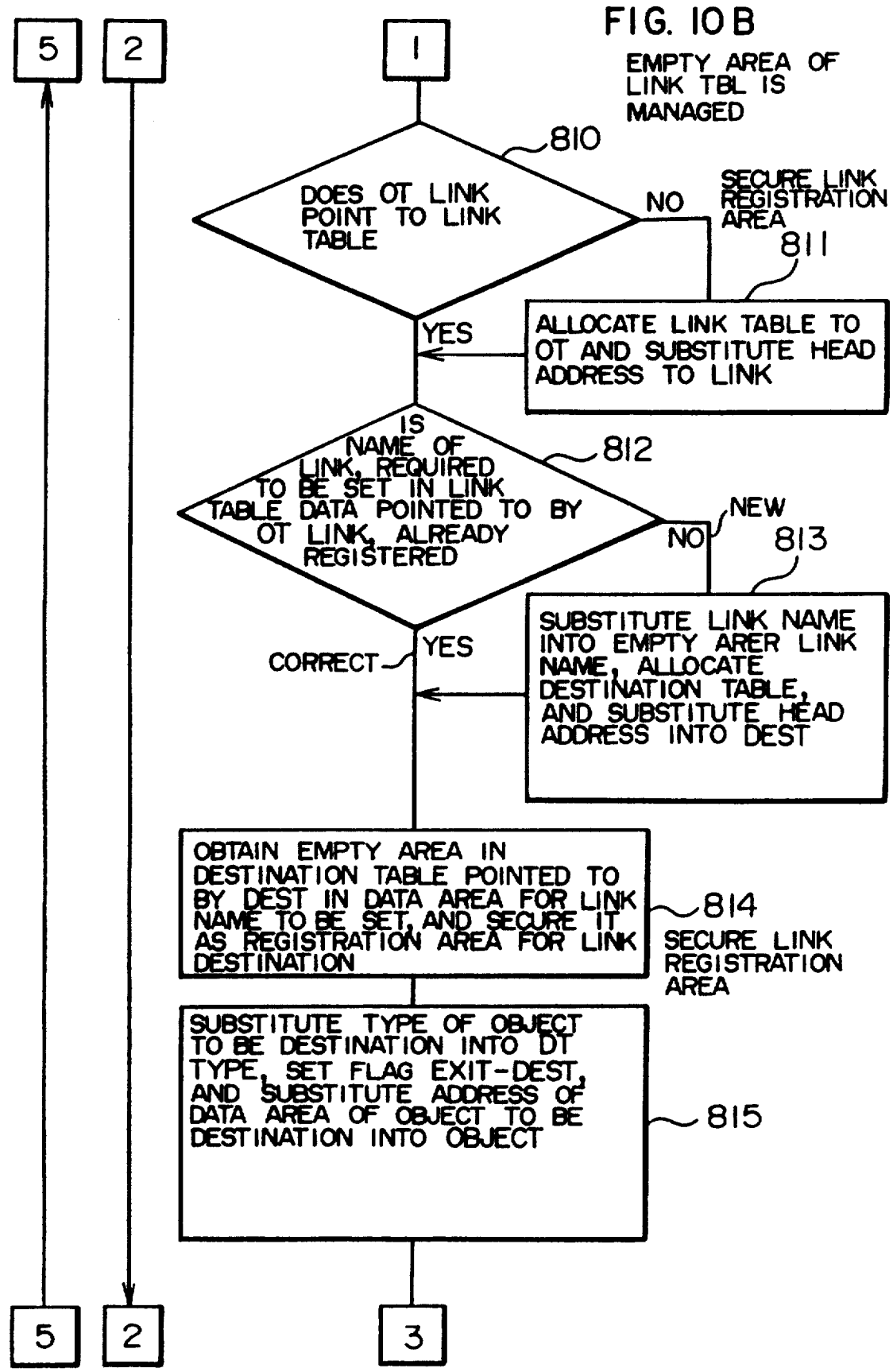

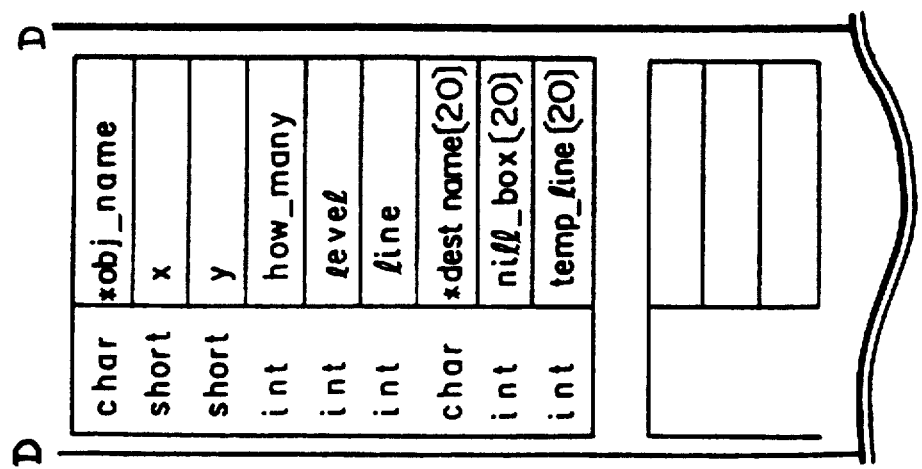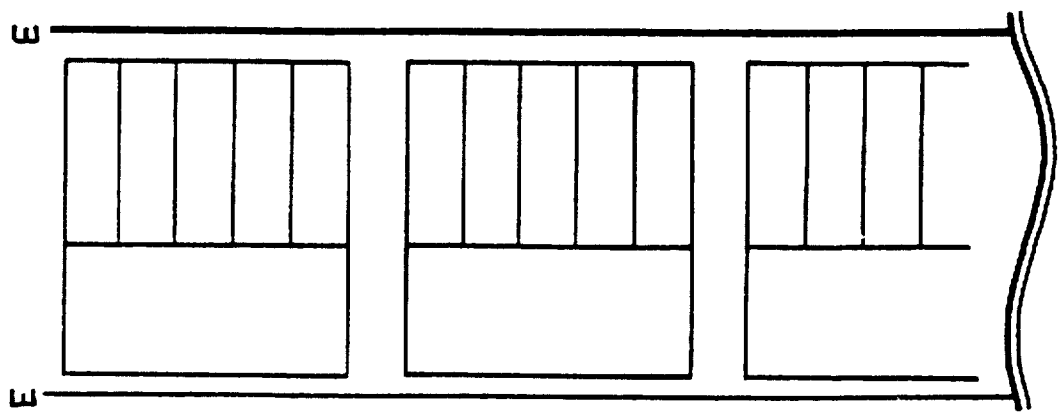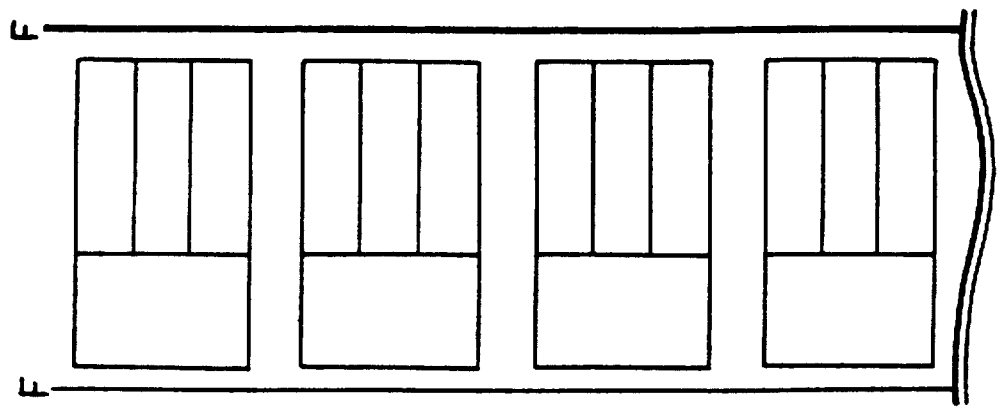
FIG. 11B

4 − (2+1) = 1
            └── A NUMBER OF NILL-BOX
      └────── LEVEL OF PARENT
└──────────── LEVEL OF CHILD

DISPLAY PROGRAM DATA AS GRAPH STRUCTURE

METHOD OF SOFTWARE DEVELOPMENT

BACKGROUND OF THE INVENTION

The present invention relates to program information managing apparatus for a programming support system which develops a desired program for a computer while retrieving programs (parts) of the basic function already developed, and more particularly to such program information managing apparatus which improve the rate of reuse, productivity and reliability of programs.

Programming support systems related to the present invention, especially, systems which reuse the conventional programs make a target program by way of the following steps (1)-(3):

(1) A step in which the system understands the required specifications (the purpose of the program) given by the user and divides the specifications into sets of simpler specifications;

(2) A step in which it is checked whether parts of specifications close to the individual specifications after the division exists or not, and if so, the parts are retrieved and a part of the program is corrected so as to satisfy the individual specifications; and (3) A step in which customized parts are combined into a desired program.

Therefore, in a program reuse system, three important points are a process for storing a part to be retrieved, a process for retrieving a part, and a process for correcting a part.

For these points, the related systems employ the following processes:

(a) Three kinds of processes for storing parts: a process for storing source codes as parts, a process for storing design information as parts and a process for storing the specifications of design as parts. The important process is to have the source codes as parts. The source codes mean programs written in a programming language; and (b) Three important kinds of retrieving processes: retrieval using a knowledge base, retrieval using a system of parts, and retrieval of similar parts. The retrieval using a knowledge base is to retrieve a part in accordance with the attributes of the individual parts using a knowledge base in which the functions and attributes of parts which indicate the nature of the parts as keywords are related to each other. The retrieval using a system of parts is to arrange parts systematically when the parts are beforehand registered and to use the arrangement for retrieving purposes. The retrieval of similar parts is to retrieve similar parts using the predetermined definition of similarity.

For example, such related arts are described in "Automatic Programming by Fabrication of Reusable Program Components" by Seiichi KOMIYA and Minoru HARADA, INFORMATION PROCESSING Vol. 28, No. 10 (1987).

In the above related art, enough measures are not taken to retrieve a program having functions not belonging to the definition of similarity when a program a little different from the existing programs is made.

The existing programs can be reused only when they can realize a function coincident with that of a target program or when they can be synthesized into the target program.

Even if a system has a function to retrieve a program similar to the existing programs, it is necessary to give a similar definition. If this definition is not given, the existing program cannot be reused. The intention of a program to be reused and the programming technique used for a program are not clear, so that it takes much time to understand how to change programs for the user's purpose of use. If correct understanding cannot be done, improper correction may be done to thereby impair the reliability of the program.

Since the systems have no retrievable data on the course of programming, the intermediate programs prepared or important ideas discovered in the programming process cannot be used, the history of programming would be lost, and it cannot be understand how to change the program in order to avoid the inclusion of errors.

SUMMARY OF THE INVENTION

It is an object of the present invention to provide a program information managing apparatus which eliminates those problems, retrieves a similar program from data stored in the system even if no definition on similarity is given beforehand, improves the efficiency of reuse of programs, expedites the understanding of programs by indicating techniques as to how to use memories and algorithm used in retrieved programs, and the intention of the programs and the course of programming, improves the efficiency of reuse of the programs, and prevents improper correction to improve the reliability of the programs.

In order to achieve the above object, according to the present invention, there is provided a program information managing apparatus comprising an input unit, a central processor controlled by a CPU, a memory for storing programs containing instructions to the central processor, and a display, characterized by means (a first- a third memories) for storing as program data (1) a source code, (2) data on a process for preparing a source code and (3) data on the intention of preparing the source code, means for indicating the relationship between the data, setting a link designating the names and addresses of data related and managing the program data through the CPU using the link, and means for controlling the display, giving a node to the name of program data, and displaying the entire program data by CPU control as a graph structure using the relationship between the nodes as a link. When a new program is prepared, an existing program having a function similar to that of the desired program is retrieved in conjunction with the data contained in the existing programs, the desired program is prepared using the retrieved existing program, links are set on the program data related to the programming, node are given to the names of the program data, and the relationship between the nodes is displayed using the graph structure. This is a first feature of the inventive apparatus.

As a second feature, the program data managing apparatus sets a link between programs prepared in the course of program development to indicate the stepwise development of the programs. The link contains a description of problems with programs between which the link is set and a process for solving the problems used in the programming. The problems with the programs between which the link is set and a process for solving the problems are retrieved using the link.

As a third feature, a link indicative of the stepwise development of programs is set between programs prepared in the course of the program development, the problems with programs between which the link is set are described in the link as in the second feature, a process for solving the problems used in the programming is described in the programs between which the link is set, and the problems with the programs between which the link is set and the process for solving the problems are retrieved using the link.

As a fourth feature, when the graph structure is displayed by changing the color of the node of the program file name referred to at present, the problems are displayed which have been solved using the link portion of the designated graph structure, and a problem solving process is displayed which has been employed in the node portion of the designated graph structure.

As a fifth feature, the program data managing apparatus sets a link indicative of the stepwise development of programs between intermediate programs prepared in the course of program development. If the programs are a plurality of code portions into which a single source code has been divided, a link is set which indicates the division. If the program includes a unity of source codes, a link is set which indicates the unification.

As a sixth feature, the program data managing apparatus sets and deletes a technique link indicative of technique data and an intention link indicative of intention data referred to when intermediate programs are made in the course of program development. If a link is set, the prepared program is registered as a new one in the system, a link is set between the old program and the new program to indicate the stepwise development of the new program. If the link is deleted, the program is backed to the one where the technique data and intention data referred to are in complete relation of inclusion to set a link indicative of the stepwise development of the program.

As a seventh feature, the link indicative of the stepwise development is analyzed, a node is attached to the name of the prepared program, and the process of program development is displayed using a graph structure in which the link represents a parent-child relationship in which the program as the origin of development is the parent.

As an eighth feature, the display control means displays the entire structure of the program data in conjunction with the set link by attaching a node to the name of the data and changes the indicated color of the node if the name of the data is designated.

As a ninth feature, the program data managing apparatus sets a technique link in technique data to express a source code developing technique used in the source code in accordance with this technique, and at the same time, an intention link is set in intention data to express the intention of the source code.

As a tenth feature, the program data storage means store a set of technique data and intention data as a graph structure in conjunction with respective data items.

As an eleventh feature, the program data managing apparatus checks whether there is a source code which uses the technique when technique data is designated, and whether there is a source code which realizes an intention when this intention data is designated. If the source code does not coincide completely with the designated data, the program data managing apparatus uses the class structure of the designated data to retrieve a source code including data on another technique or intention related to the designated data, and indicates the retrieved source code as a similar program using the display control means.

In the present invention, even if a program having the same function as a target program is not stored in the system, the class structure of program data classified as a graph structure can be tracked on the basis of the concept of the object or the link of a program technique to realize the object, a program similar to the target program can be retrieved and the course of development of the program can be understood.

Therefore, the entire structure of the program data is easy to understand, so that the reuse rate, productivity and reliability of programs are improved.

BRIEF DESCRIPTION OF THE DRAWINGS

FIGS. 6A to 6D are flowcharts indicative of retrieval in one embodiment of the present invention;

FIG. 9 is a flowchart illustrating the course of programming in one embodiment of the present invention;

FIGS. 10A to 10D are flowcharts illustrating the flowchart of FIG. 9 in more detail;

DESCRIPTION OF THE PREFERRED EMBODIMENTS

Figure 1:
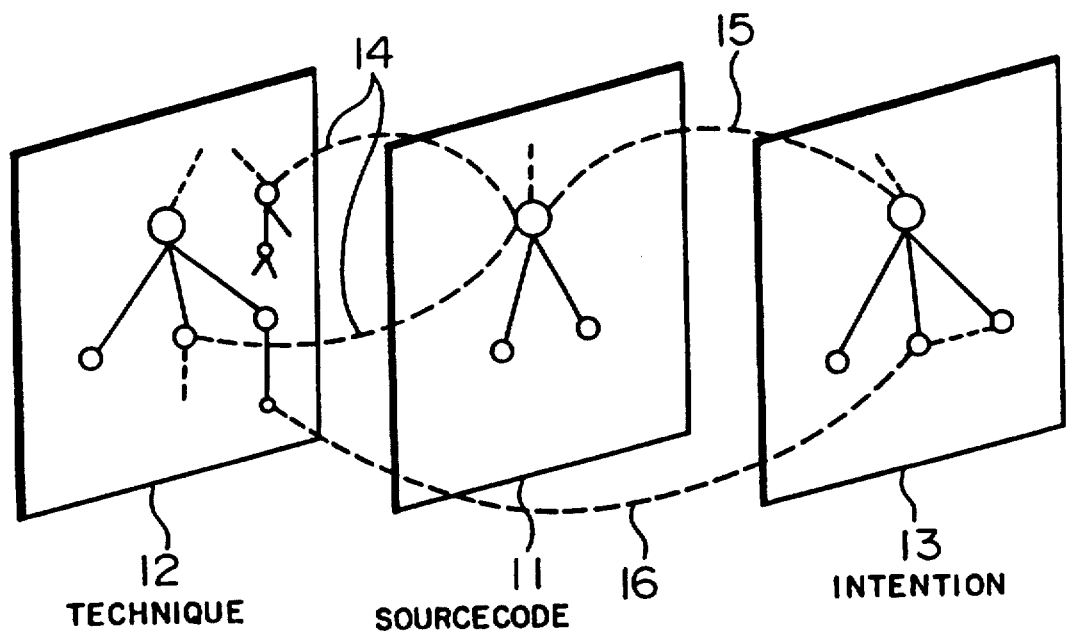
FIG. 1 illustrates the basic structure of program data in one embodiment of the present invention.

One embodiment of the present invention will now be described with reference to the drawings. FIG. 1 illustrates the basic structure of program data in the embodiment in which the program data includes a program source code 11, a programming technique 12 and a program intention 13, each component being able to have a graph structure in accordance with the data thereof.

Links can be set between the respective components in order to indicate their relationship; namely, a link 14 to indicate the correspondence between a source code and a technique, a link 15 to indicate the correspondence between the source code and intention, and a link 16 to indicate the correspondence between the intention and technique.

In this way, links to indicate the relationship between the respective program data can be set freely.

Figure 2:
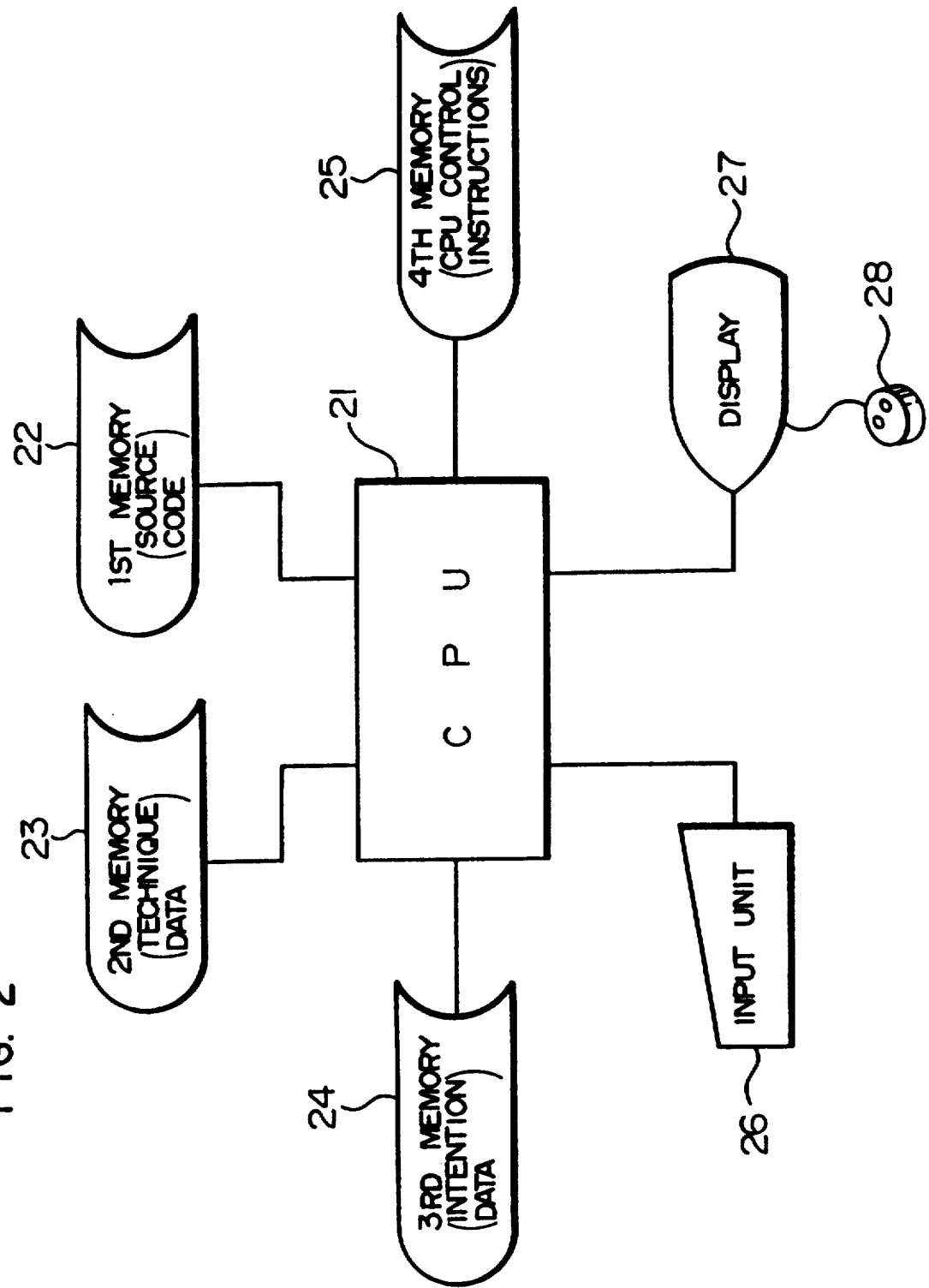
FIG. 2 is a schematic of a programming support system in one embodiment of the present invention.

FIG. 2 is a schematic of a programming support system in one embodiment of the present invention. The system includes a central processing unit (hereinafter referred to as CPU) 23; a first to a fourth memories 22 to 25; an input unit 26; a display 27; and a position designating unit 28.

The memories 22 to 24 store a source code written in a programming language and to be reused, a keyword to represent a programming technique and a keyword to indicate the object of a program. These respective data are arranged in the corresponding groups in the form of a tree in accordance with their dependent relationship.

The fourth memory 25 stores instructions to CPU 21. The program stored in the fourth memory 25 includes, for example, a program to track the graph structure of the technique along its structure.

While in the particular embodiment, the programming language to be used is a logical language prolog, the present invention may be applicable to any programming language without depending on that particular language by changing data on the programming languages stored in the memories 22 to 24.

CPU 21 processes data in accordance with instructions given via the input unit 26 and the position designating unit 28 on the display 27 and displays the result on the display 27.

Examples of programs used in the particular embodiment are:

append ([ ], L, L).
append ([A|X], Y, [A|Z]): - append (X, Y, Z).

These programs are written using a programming language "append (a, b, c)" where c is the answer of addition of b to a for data indicated by the symbol (a, b, c). Another example is described using:

reverse ([ ], [ ]).
reverse ([H|T], L): -
reverse (T, RT), append (RT, [H], L).

These programs are written by using a reverse ([a, b], c) means the reverse of the order of data [a, b] to [b, a], which is represented by the answer c. The empty [ ] in the program taken as an example indicates a data list with no data contained therein. Therefore, an append ([ ], L, L) means that addition of a second list L to a first list with no data contained therein results in a list L (third) as the answer.

The symbol ": -" means processing using the program language shown after the symbol ": -" in order to obtain the answer.

Therefore, in
append ([A|X], Y, [A|Z]): - append (X, Y, Z),
if A = a, X = [ ], Y = [b, c], the answer Z is append ([A|X], Y, [A|Z]): - append (X, Y, Z)
       a[ ]   b,c  a              [ ] b,c b,c Thus [A|Z] becomes [a, b, c].

If T is data arranged in the order of [b, c] in reverse (T, RT), RT means data [c, b] reversed in the order. Therefore, the answer L of the reverse ([H|T], L) taken as the example is given by reverse ([H|T], L): -
         a  b,c reverse (T, RT), append (RT, [H], L)
        b,c c,b         c,b  a  c,b,a where H is a, and T is [b, c]. Thus it will be understood that L is [c, b, a].

In the append (a, b, c), a, b, and c are referred to as a first, a second and a third arguments, respectively.

Necessary data such as technique data or intention data are added to such a program and the result is stored in the first memory 22 in the following form:

--- program: append;
consist-of:
append ([ ], L, L).
append ([A|X], Y, [A|Z]): -append (X, Y, Z).
technique: recursion, synthetic/divisional
argument,
intention: list, concatenation, division,
comments: the concatenation of a list of first
arguments and a list of second arguments is a list of
third arguments

---

In this case, the portion starting from the "program" denotes the name of the program, the portion starting from the "consist - of" denotes the source code of the program, the portion starting from the "technique" denotes a keyword indicative of the programming technique used in the program, the portion starting from the "intention" denotes a keyword indicative of the intention contained in the program, and the portion starting from the "comments" denotes a keyword indicative of the explanation of the program.

Figure 3:
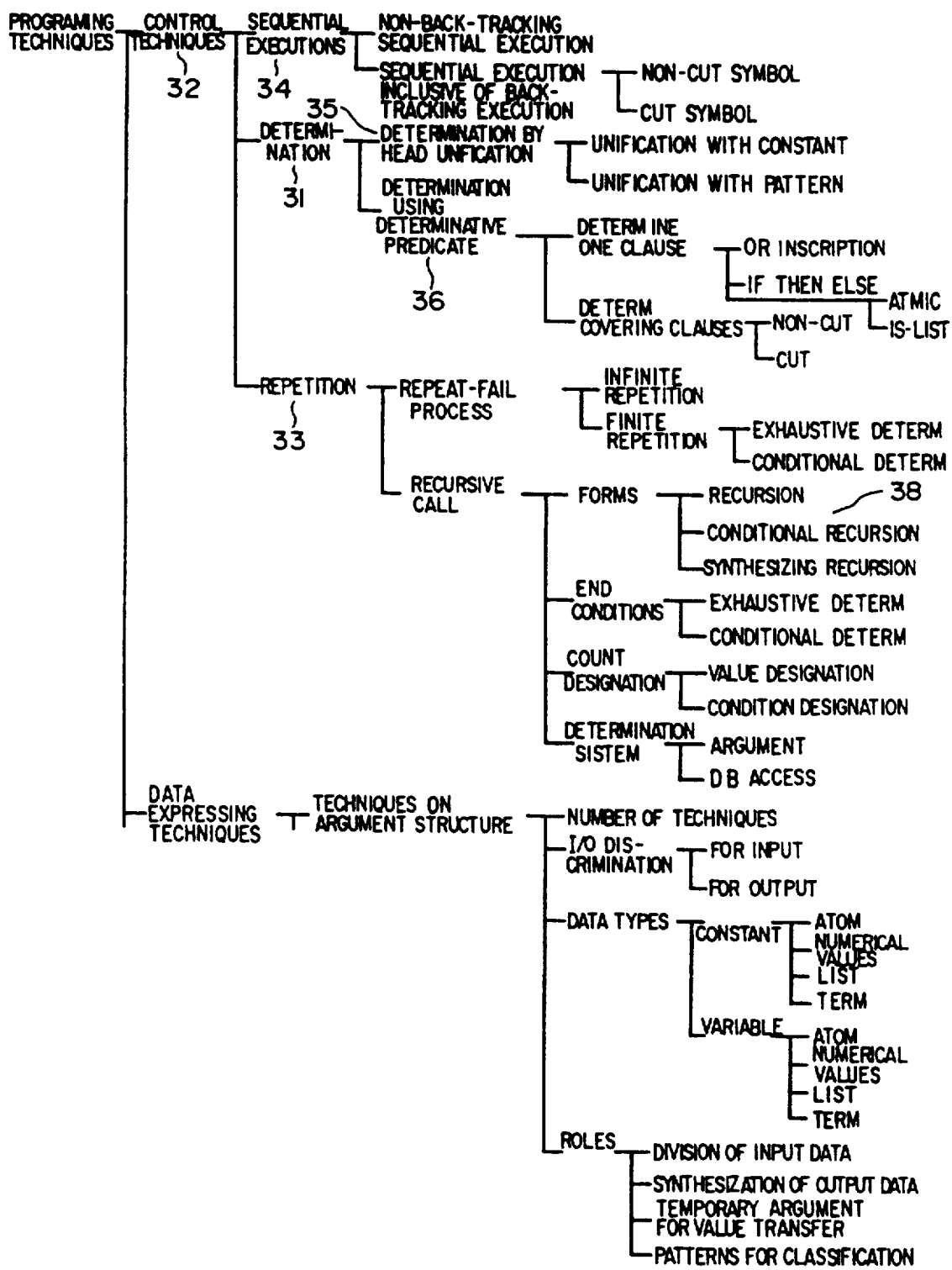
FIG. 3 illustrates the graph structure of a programming process stored in a second memory in one embodiment of the present invention.
Figure 4:
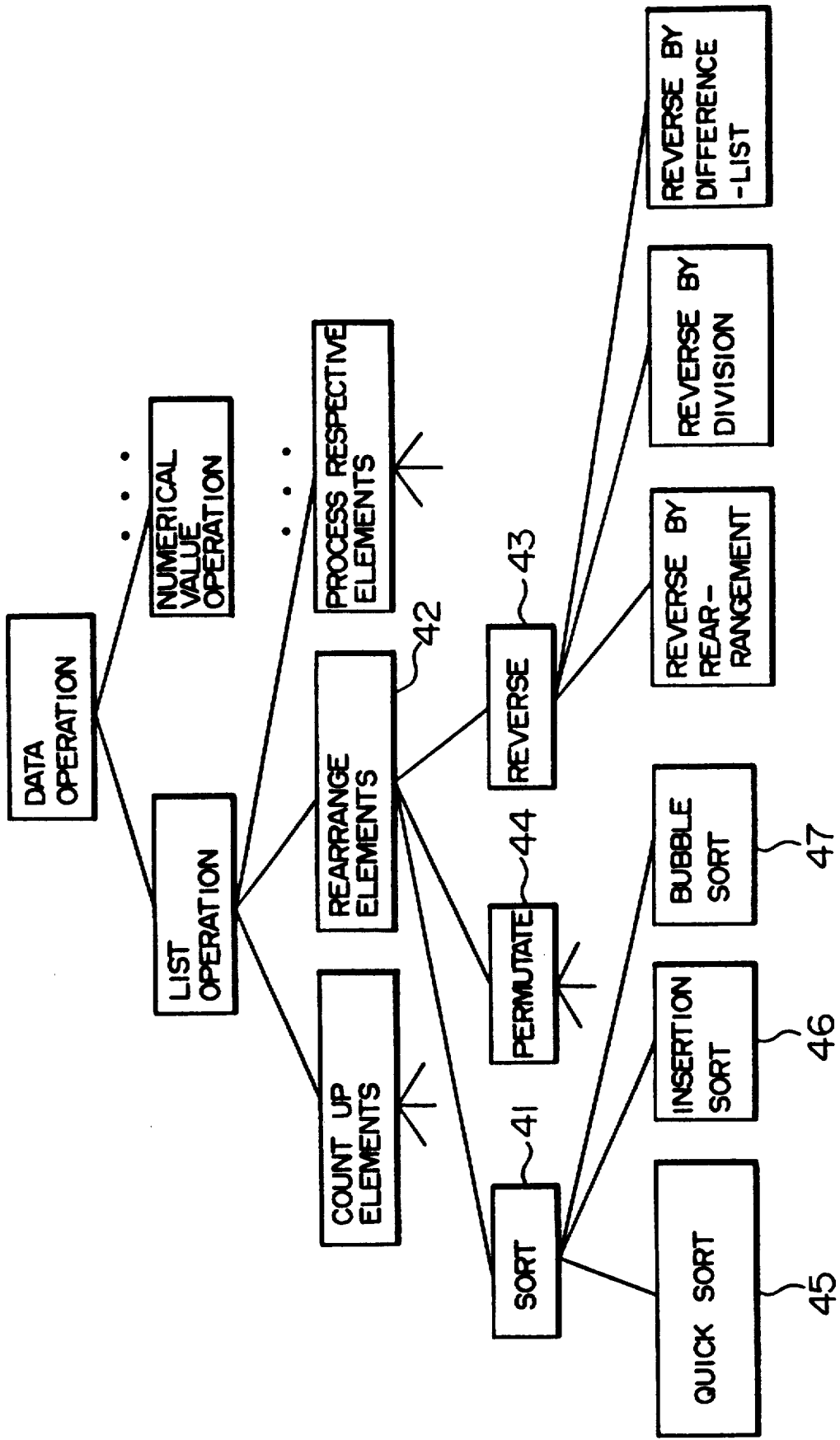
FIG. 4 illustrates the graph structure of a language representing the intention stored in a third memory in one embodiment of the present invention.

FIG. 3 illustrates the graph structure of a programming technique stored in the second memory in the embodiment of the present invention. FIG. 4 illustrates the graph structure of languages representing the intention stored in the third memory in the embodiment of the present invention.

In the particular embodiment, when the user makes a program, he imagines a concept related to some object, determines which of the technique, intention and source code the concept is, gives a command to the corresponding one of the memories 22 to 24 to retrieve its corresponding data in accordance with the determined kind, uses the retrieved data and the link set in that data to retrieve data other than the data which the user has imagined, understands and reuses the existing programs as they are and makes a desired program.

If the user needs data related to the data retrieved on the basis of the data which the user has imagined, he can obtain more detailed data or more abstract data by tracking the internal class structure of the second memory 23 or the third memory 24.

If the class is tracked upward from the keyword "determination" 31 in the class structure of the programming technique such as shown in FIG. 3, it will be understood that this structure is one kind of the "control technique" 32, and that there are similar techniques such as "repetition" 33 and "sequential execution" 34. If the class is tracked downward, the "determination" 31 is specifically classified to "determination by head unification" 35 and "determination using determinative predicate" 36.

Similarly in FIG. 4, if the class is tracked upward from the keyword "sort" 41 using the graph structure of a language representing a fourth object, it will be understood that the sort is one example of the general concept "rearrangement of elements" 42, and there are similar concepts "reverse" 43, and "permutation" 44. If the class is tracked downward from "sort" 41, there are specific techniques "quick sort" 45, "insertion sort" 46 and "bubble sort" 47.

The reuse of programs and desired programming using such data will now be described in detail. First, assume that the user knows the object of his desired program and does not know well how to realize the program. In this case, the user gives to the system a keyword representing the function of his desired program, and retrieves the third memory 24 storing data representing the object.

For example, as shown in a list [a,b, [c,d]], if an element in the list further includes a list [c,d], the problem of making the program "full reverse" in which the contents of the list of the element are reversed to [[d,c], b,a] is considered. Since the given problem is the "reverse of the list", the keywords "list" and "reverse" are given to the system. Thus, the system refers to the second and third memories 23 and 24 to retrieve the source code stored in the first memory 22, and seeks out a program having the keywords "list" and "reverse".

In the particular embodiment, the "reverse" to simply reverse elements in the system is defined and the keywords given to the "reverse" are "list" and "reverse". Therefore, this source program is retrieved and the following source codes for the reverse are displayed on the display 27 as an example of programs using the reverse technique:

```
reverse ([ ], [ ]).
reverse ([H|T], L): -reverse (T, RT), append
(RT, [H], L).
```

While in the particular embodiment the two keywords given to the source code coincide, the keyword may be a single one.

The user gives several input and output examples to the program "reverse". As a result, if the elements of an input list are a term such as "a (b, c)" or an atom such as "a, b, c," there are no problems, but if the list is [a, b, c], the user would discover a bad case and recognize that determination using the kind of elements will be required.

In order to know a technique of classification in accordance with kinds of elements, the user performs retrieval by giving the keyword "determination" for the technique of determination stored in the second memory 23. Thus, the system displays on the display 27 the techniques 35 and 36 immediately below the "determination" 31 of FIG. 3 in rank.

The user selects one meeting his object among these techniques. In this case, the user selects "determination using a determinative predicate" 36 in which whether particular processing is to be performed is determined using a conditional sentence attached to the beginning of a program to be processed, and selects an atomic to determine whether an argument is an atom as a determinative predicate which will be a conditional sentence. The user makes a program shown below, using an atomic (H) in accordance with the selected atomic:

```
full_reverse ([ ], [ ]).
```

-continued
```
full_reverse ([H|T], L): -
atomic (H), full_reverse (T, TT),
append (TT, [H], L).
```

Atomic (H) is a program to determine whether the list H is atom or not.

If the list H is not atom, the following determination is performed. Since the user does not have specific data on this, he refers to the program which he made so far. In this case, since the program structure is a recursive structure comprising branching of case under condition and using "full_reverse" to obtain the answer of the full_reverse, the description of a technique stored in the second memory 23 is retrieved using the keyword "conditional recursion".

As a result, the system displays on the display 27 the graph structure of a technique containing "conditional recursion" 38 as a description of the technique of conditional recursion.

As an example of this technique, the system retrieves a source program stored in the first memory 22 and seeks out an example of program having a structure represented by the keyword "conditional recursion" as data on the technique and displays on the display 27 the following program, for example:

```
(1) flatten ([ ], [ ]).
(2) flatten ([H|T], L): -
atomic (H), flatten (T, TT), append ([H], TT, L).
(3) flatten ([H|T], L): -
flatten (H, HH), flatten (T, TT),
append (HH, TT, L).
```

The program of (3) is executed only when the list H is determined not to be an atom, namely, only when the list H is constituted by a list, at (2). Since the user intends to make a program to reverse all lists such as [a, b, [c, d]]→[[d, c], b, a] inclusive of a list in a list, he can make the following program by replacing "flatten" mechanically with "full_reverse":

```
(1)' full_reverse ([ ], [ ]).
(2)' full_reverse ([H|T], L): -
atomic (H), full_reverse (T, TT),
append (TT, [H], L).
(3)' full_reverse ([H|T], L): -
full_reverse (H, HH), full_reverse (T, TT)
append (TT, HH, L).
```

This is a desired program.

Figure 5:
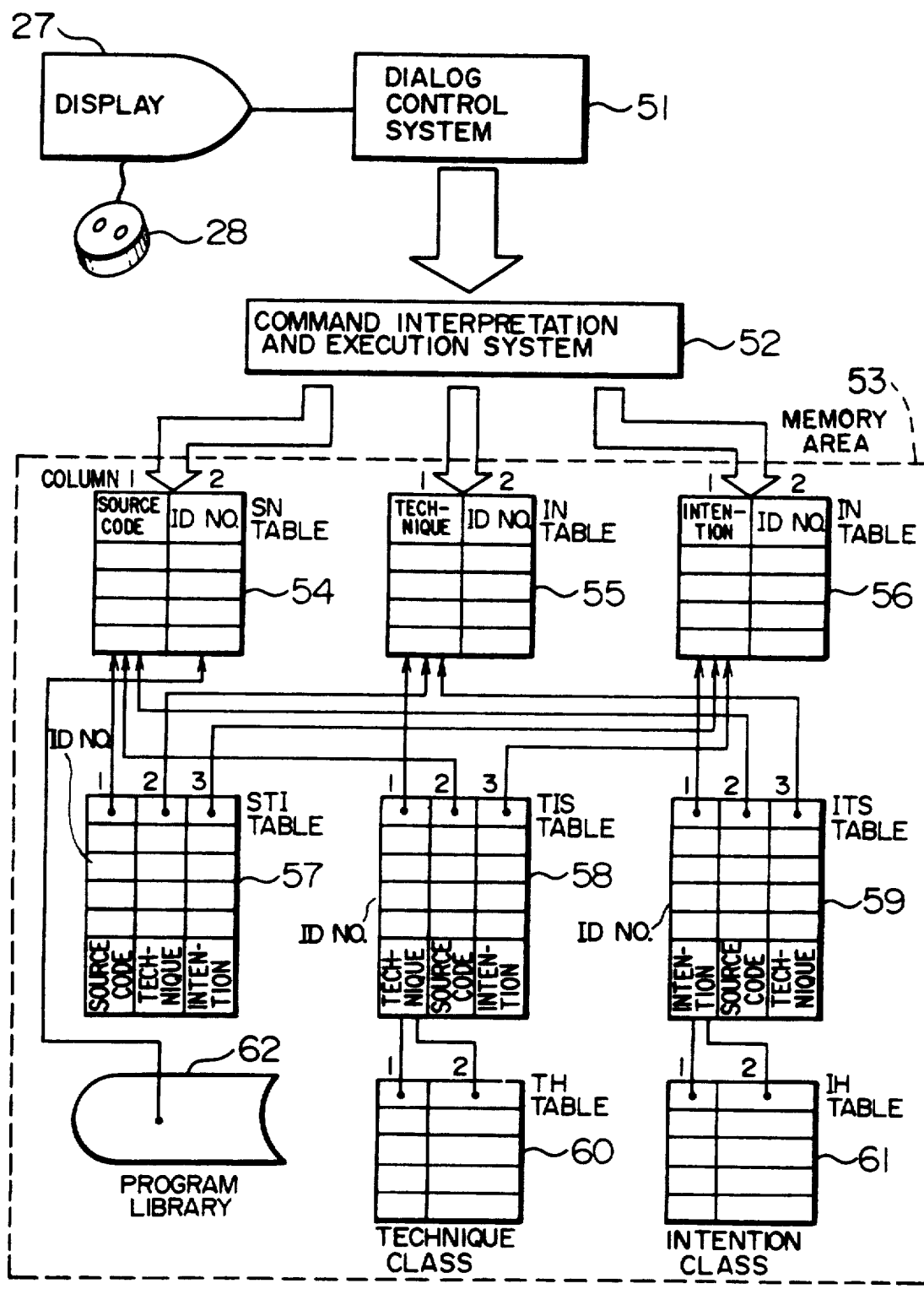
FIG. 5 is a schematic of software in one embodiment of the present invention.

The structure of software to realize such a function will now be described in detail. FIG. 5 is a schematic of software in one embodiment of the present invention. The software in this embodiment is composed of a dialog control system 51 to control a dialog with the user, a command interpretation and execution system 52 to interpret and execute a command input from the user, and a memory area 53 to store various data.

The memory area 53 includes a source code correspondence table (hereinafter referred to as an SN table) 54 in which first columns each contain a source code name and second columns each contain the corresponding identification No., a technique correspondence table (hereinafter referred to as a TN table) 55 in which first columns each contain a technique name, second columns each contain the corresponding identification No., an intention correspondence table (hereinafter referred to as an IN table) 56 in which first columns each contain an intention name and second columns each contain the corresponding identification No., a correspondence table (hereinafter referred to as a STI table) 57 comprising a list of identification Nos., allocated to source code, technique and intention columns, a correspondence table (hereinafter referred to as a TIS table) 58, and a correspondence table (hereinafter referred to as an ITS table) 59, a correspondence table (hereinafter referred to as a TH table) 60 indicative of the relationship between classes of techniques, a correspondence table (hereinafter referred to as an IH table) 61 indicative of the relationship between classes of intention, and a program library 62 storing the actual source program.

By such arrangement, the dialog control system 51 transfers a command, input by the user using the position designating unit 28 on the display 27 such as a keyboard or a mouse, to the command interpretation and execution system 52.

The dialog control system 51 transfers <kind of data>, <selected data> and <kind of pointer to be tracked> to the command interpretation and execution system 52.

The <selected data> is data indicative of the start point from which the pointer is tracked. The <kind of data> is a flag indicative of which of the source code, technique data and intention data the selected data is. The <kind of the pointer to be tracked> is data indicative of which of the pointers set in the selected data is to be tracked.

Figure 6A:
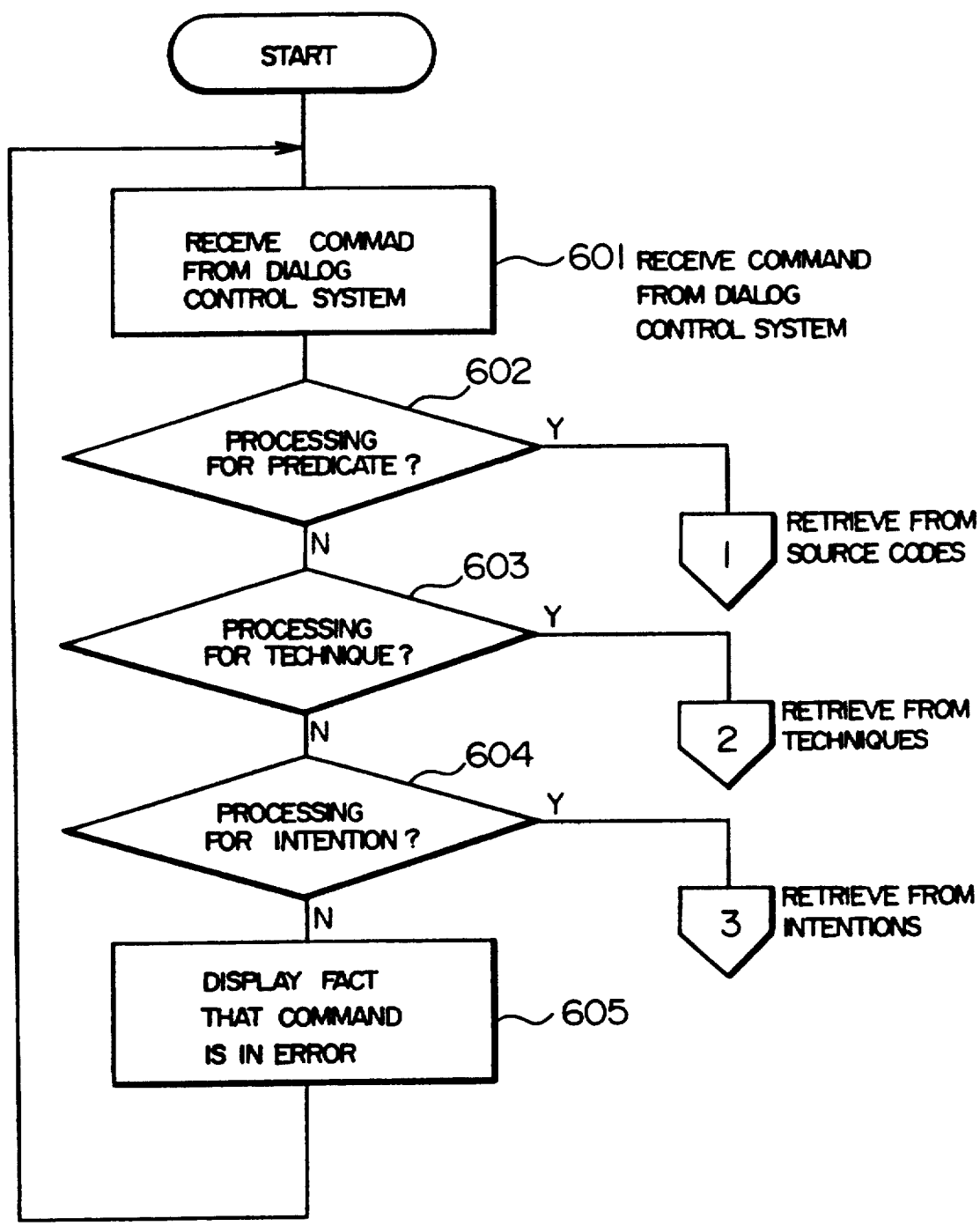
Figure 6D:
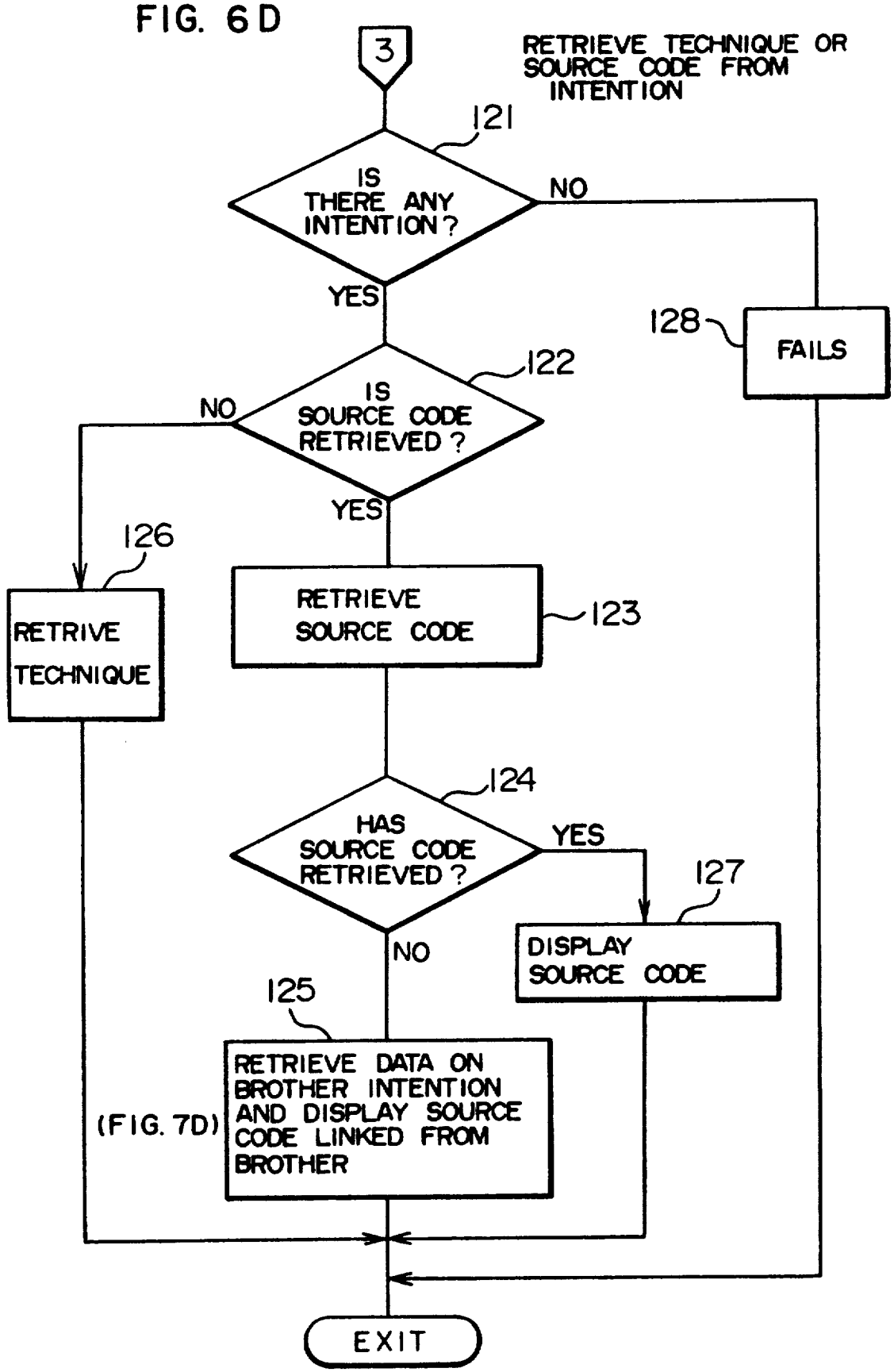

The details of processing performed by the command interpretation and execution system 52 controlled by CPU 21 in the particular embodiment will now be described. FIG. 6A is a flowchart indicative of retrieval. The command interpretation and execution system 52 uses the <kind of data> and <selected data> transferred from the dialog control system 51 (601), retrieves the SN table 54 in accordance with the kind of the data, and determines whether processing is directed to the predicate of the source code (602). If the answer is yes, control passes from the source code to a flow to retrieve technique or intention data, as shown in FIG. 6B. If no, the TN table 55 is retrieved and it is determined whether processing is directed to the technique (603). If the answer is yes, control passes from the technique to a flow to retrieve intention or a source code, as shown in FIG. 6C. If the answer is no, IN table 56 is retrieved and it is determined whether processing is directed to intention (604). If the answer is yes, control passes from the intention to a flow to retrieve a technique or a source code, as shown in FIG. 6D.

If processing is not directed to any one of processing of a predicate (SN table 54), processing of a technique (TN table 55), and processing of intention (IN table 56), the occurrence of a command error is displayed (605) and control return to step 601.

In the flowchart of FIG. 6B, it is first checked whether there is a desired source code (101). If yes, it is determined whether a technique is retrieved (102). If no, it is determined whether intention is retrieved (103). If there is no desired source code or if no items of technique and intention to be retrieved are selected even if there is a source code, an error is indicated (106).

Figure 7A:
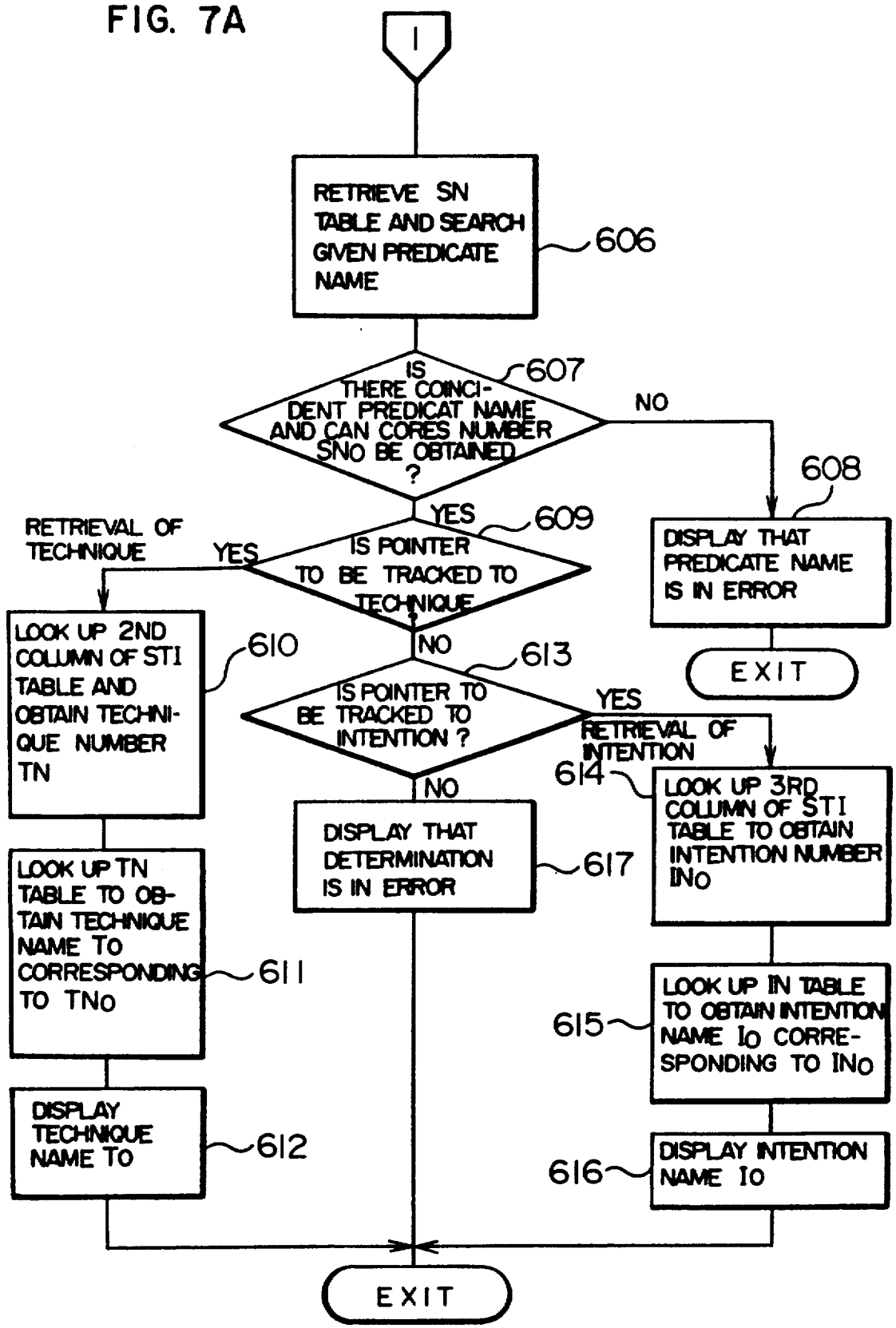
FIGS. 7A to 7E are flowcharts illustrating the flowcharts of FIGS. 6A to 6D in more detail.

FIG. 7A illustrates the flowchart of FIG. 6B in more detail. The flow of the flowchart of FIG. 7 corresponds to that of FIG. 6B. First, the SN table 54 is searched to obtain ID No. $SN_0$ corresponding to a given predicate name (606). A first column which is $SN_0$ is searched in the STI table 57 using $SN_0$ as a key (607).

If a number coincident with $SN_0$ is found, the number $TN_0$ indicative of the technique stored in the second column of the same row is obtained (609, 610). If there is no predicate name coincident, that the predicate name is erroneous is indicated (608). The first column of the TN table 55 is checked to obtain a row of characters $T_0$ indicative of a technique corresponding to $TN_0$ (611). Finally, the row of characters $T_0$ is displayed as a result of command execution and control returns to the dialog control system 51 (612).

If the name of a predicate is designated and intention data is to be tracked, the third column of STI table 57 is searched to check whether there is a column having ID No. $IN_0$ (614).

The first column of IN table 56 is searched to obtain the name of intention $I_0$ corresponding to $IN_0$ (615). Finally, the row of characters $I_0$ is displayed as the result of the command (616).

The flowchart of FIG. 6C which indicates the retrieval of intention or a source code from a technique will be described. First, a desired technique is sought (111). Then it is determined whether the source code is retrieved (112). If no, intention is retrieved (116). If yes, the source code is retrieved (114). If there is no desired source code, control returns to the starting block to retrieve another technique which is in brother relationship with the technique found first, and a linked source code is retrieved from the technique in the brother relationship (115).

Figure 7B:
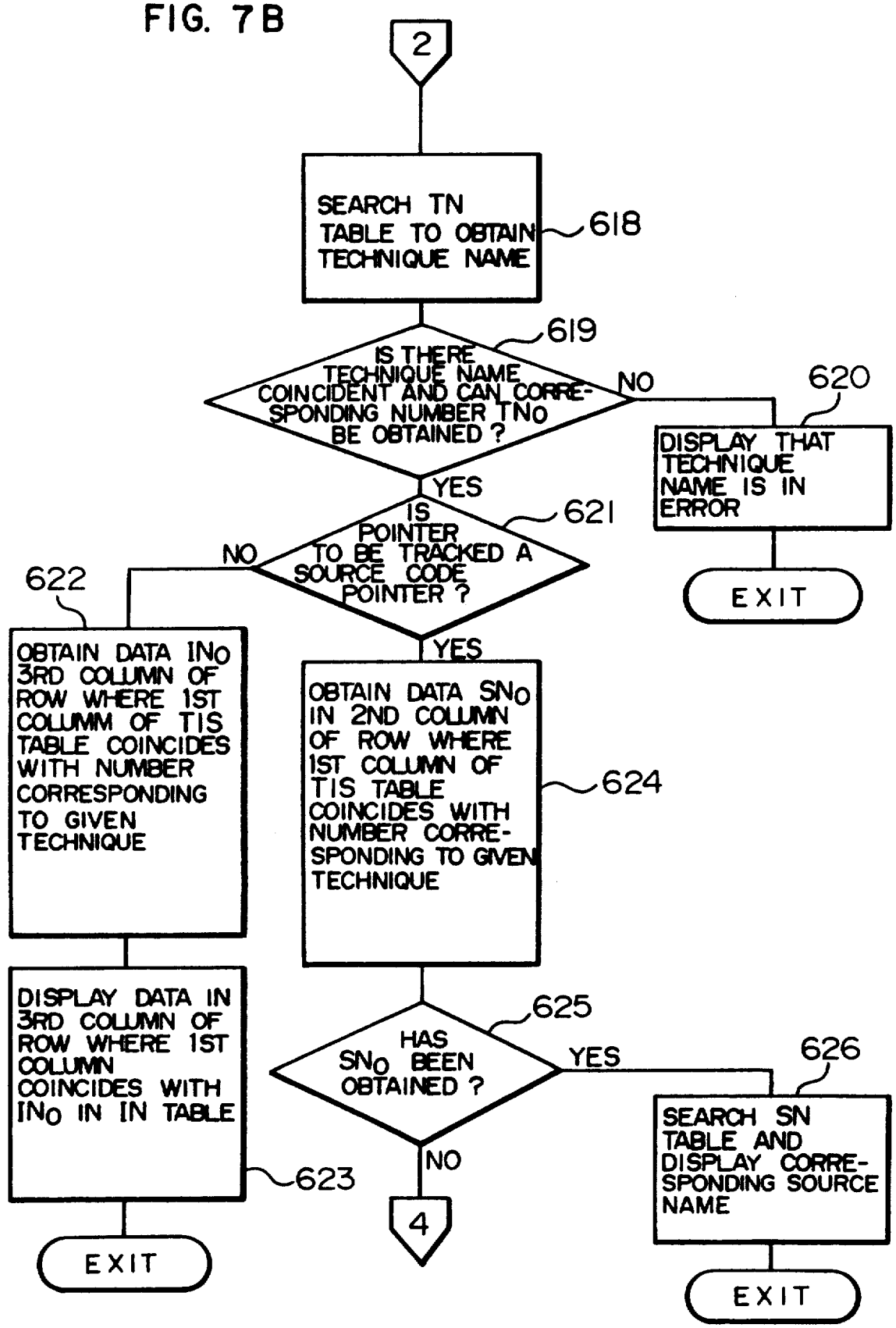
Figure 7C:
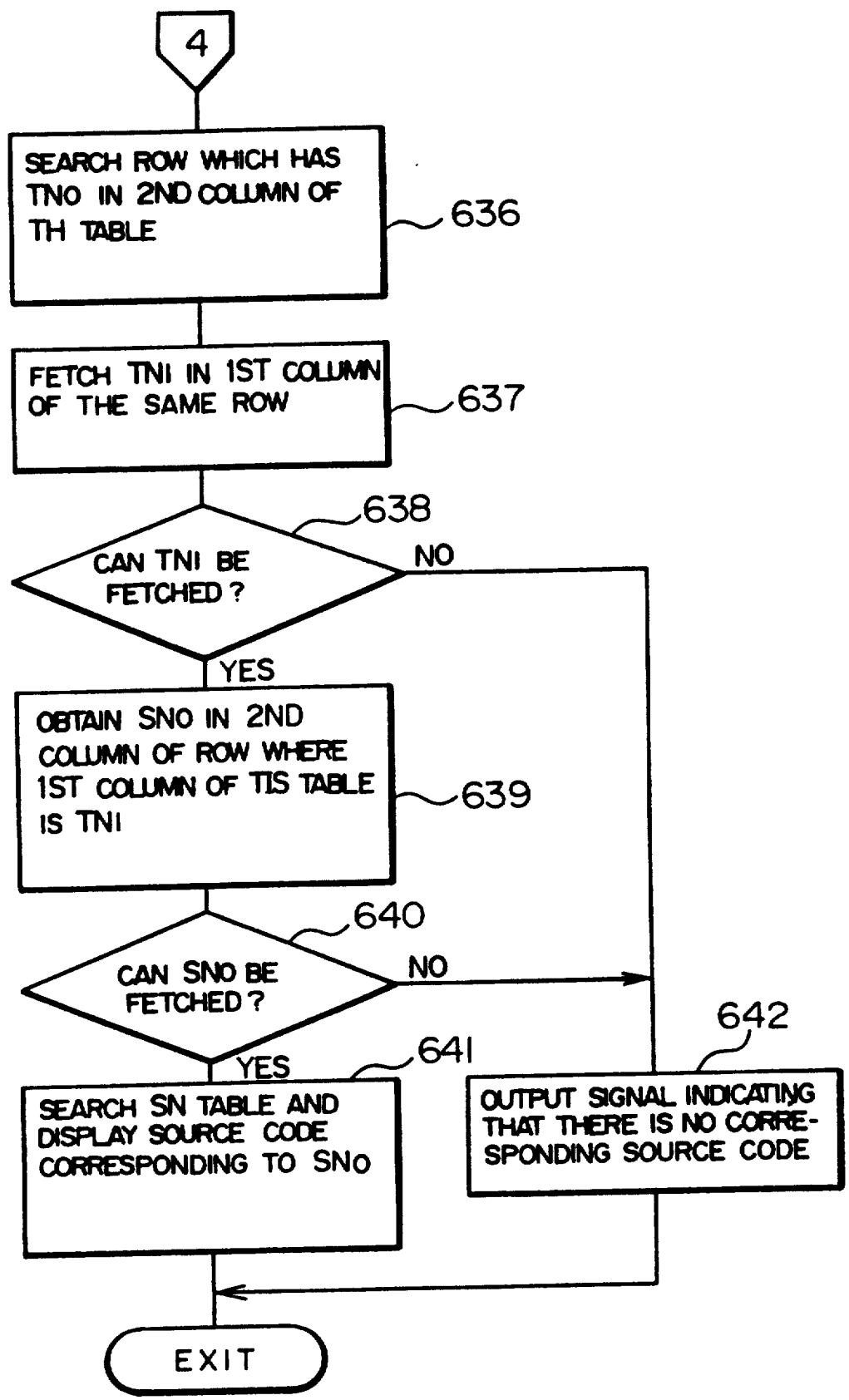

FIGS. 7B and 7C illustrate the flow of FIG. 6C in more detail. FIG. 7C illustrates, in detail, a process to retrieve the technique in brother relationship and then a source code therefrom. The flow of the flowchart follows FIG. 6C. In FIG. 7B, the TN table 55 is retrieved to obtain a number $TN_0$ corresponding to a given technique (618). The first column of TIS table 58 is then retrieved to search a number coincident with $TN_0$ (619). If that number is found, the number $SN_0$ in the second column of the same row as that number is obtained (621, 624).

If there is no number coincident with $TN_0$, that the name of the technique is in error is displayed (620).

A predicate having the same number as $SN_0$ is searched from SN table 54, and its source code is retrieved from source code library 62 and displayed on display 27 (625, 626).

If no number indicative of a predicate name is stored in the second column of a row having the same number as $TN_0$ (625), it is indicated that there is no source program corresponding to the technique. In this case, the processing shown in FIG. 7C is performed. First, the second column of TH table 60 is checked to search the same number as $TN_0$ (636).

If this number is found, the number $TN_1$ other than $TN_0$ stored in the first column of the same row is taken (637). A technique corresponding to $TN_1$ corresponds to the classification of a technique having a function similar to that of the technique input by the user, namely, a so-called technique in brother relationship.

The first column of TIS table 58 is checked to search $TN_1$. If $TN_1$ is found, a source program corresponding to $SN_0$ stored in the second column is displayed on the display 27 by performing processes similar to those mentioned above (638 to 641).

Even if the second column is empty (640), TH table 60 is not checked and the fact that there is no corresponding source code is displayed (642). Thus the source program is retrieved from data on the technique.

Figure 7D:
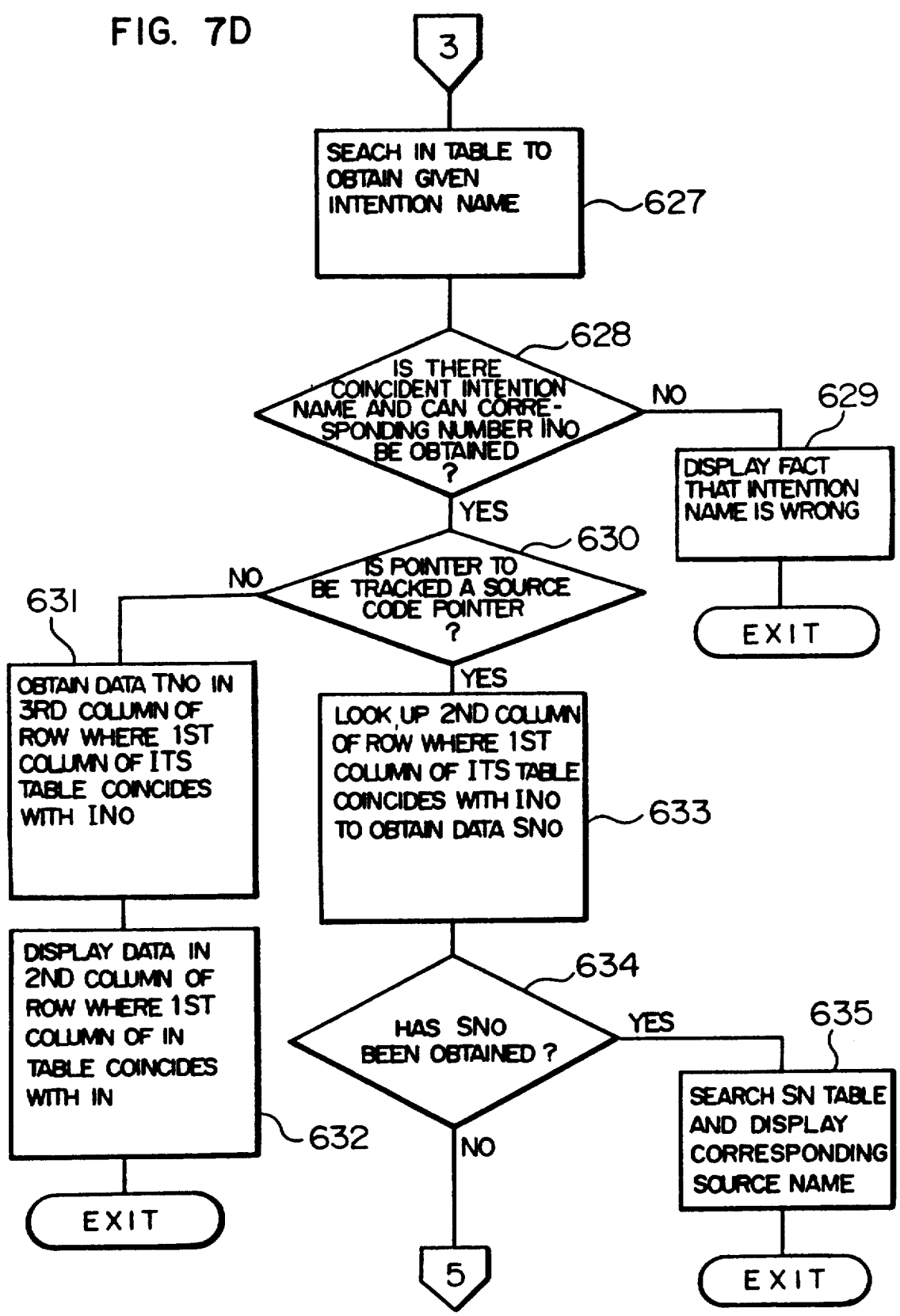
Figure 7E:
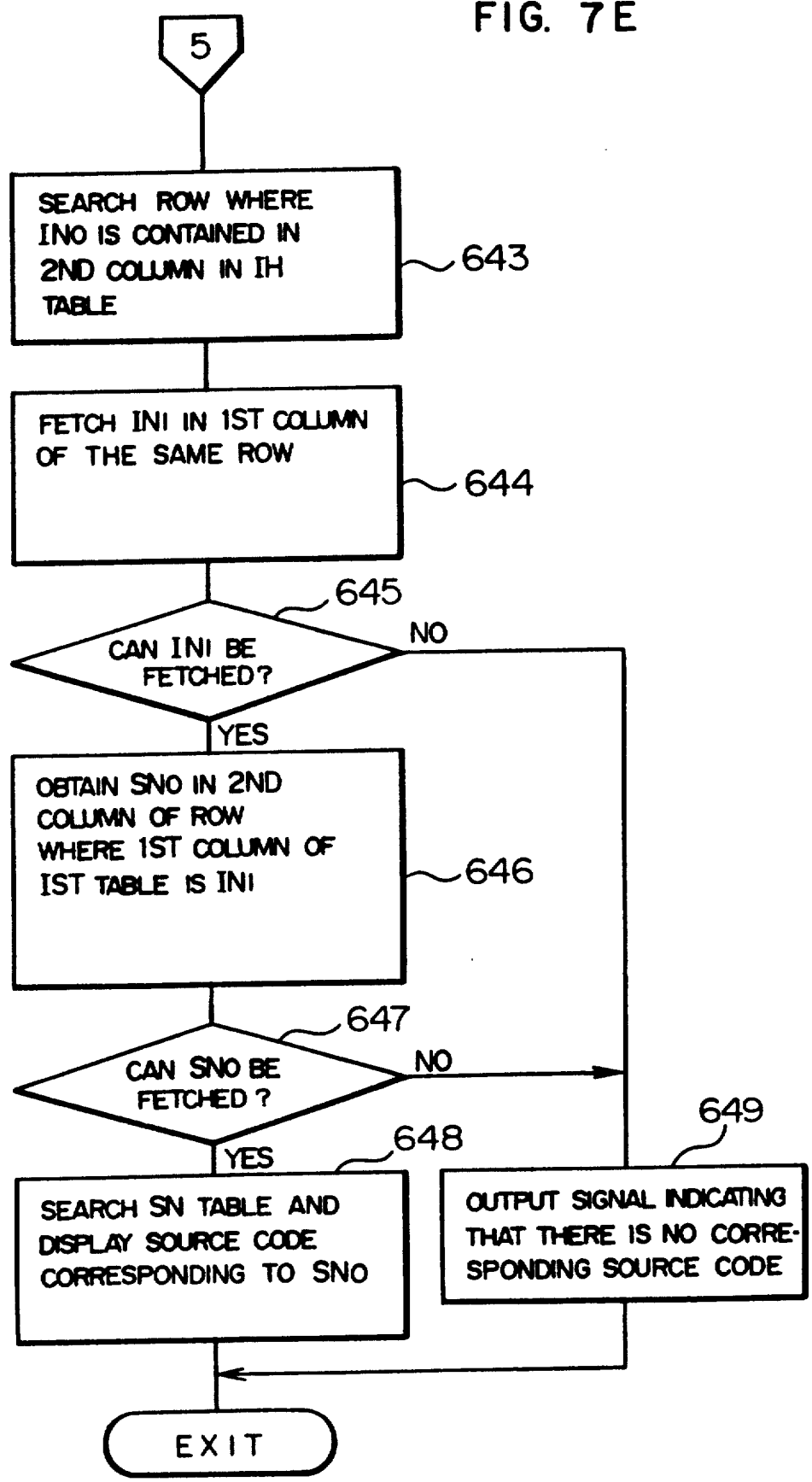

The flowchart of FIG. 6D which illustrates the retrieval of a technique or a source code from the intention will be described. First, it is determined whether there is a desired intention (121). If the answer is yes, it is determined whether the source codes are retrieved or not (122). If no, the techniques are retrieved (126). If the answer is yes, the source codes are retrieved (123). If a desired source code is found, it is displayed (127). If not, control returns to the starting block, another intention is retrieved which is in brother relationship to the intention found first, and a source code linked from the intention in brother relationship is retrieved and displayed (125). FIGS. 7D and 7E illustrate the flowchart of FIG. 6D in more detail. FIG. 7E illustrates the retrieval of an intention in brother relationship and the source code linked to the intention. In FIG. 7D, the name of a given intention is retrieved from IN table 56 (627) to obtain the number $IN_0$ corresponding to the name of the intention (628).

If the pointer to be tracked is not a source code pointer (630), data $TN_0$ of the third column in the row in which the first column of ITS table 59 is $IN_0$ is obtained (631), data in the second column of the row in which the first column is $IN_0$ in IN table 56 is displayed (632).

If the number $IN_0$ corresponding to the intention name is not obtained (628), the fact that the name of intention is in error is displayed (629).

If the pointer to be tracked is a source code pointer (630), the second column of the row in which the first column of ITS table 59 is $IN_0$ is checked to obtain data $SN_0$ (633, 634). SN table 54 is then retrieved to display the corresponding source name (635). If no $SN_0$ is obtained (634), the row in which $IN_0$ is obtained in the second column is searched in IH table 61 (643).

If a value $IN_1$ in the first column adjacent to the second column is taken (644, 645), and the value $SN_0$ in the second column of the row in which the first column is $IN_0$ in ITS table 59 is taken (646, 647).

SN table 54 is then retrieved and a source code corresponding to $SN_0$ is displayed (648). If $SN_0$ is cannot be taken (647), the fact that there is no corresponding source code is displayed (649).

In this way, the user can easily access necessary data from any one of the technique, intention and source code, easily retrieve the existing program and understand the object of the program, so that reuse of the programs is easy.

The management of data on a programming process will be described using an example of a process for making a program "full_reverse" to reverse all the data in the list in the particular embodiment. First, related programs retrieved using the keywords "list" and "reverse" are recorded as one object. The programs retrieved to make the desired program "full_reverse" are as follows:

['full_reverse' (1)]
reverse ([ ],[ ]).
reverse ([H|T], L):-
reverse (T, RT), append (RT, [H], L).

The number (1) annexed to the program name 'full_reverse' is a programming serial number indicative of the order in which the desired program is made.

In this program, the "list" 37 of FIG. 3 is used as a technique in the data type and the "reverse" 43 of FIG. 4 is used as intention, so that two kinds of links, namely, a technique link and an intention link, are set as data in the object "'full reverse' (1)", and the "list" and "reverse" are set as the corresponding objects to which the links extend (hereinafter referred to as destinations).

The program "'full_reverse' (1)" operates well if the elements of the input list are an item or atom, but may not operate well if the elements of the input list are a list.

In order to cope with this, classification is done in accordance with kinds of elements and a program which uses an atomic to determine whether an argument as a determinative predicate is an atom or not is recorded as the following object. This program is shown as follows by adding an atomic (H) to determine whether an element of list H is atom:

['full_reverse' (2)]
full_reverse ([ ], [ ]).
full_reverse ([H|T], L):-
atomic (H), full_reverse (T, TT),
append (TT, [H], L).

This program is made on the basis of the first made program ['full_reverse' (1)], so that a new link of the kind of "development" is set from the object ['full_reverse' (1)] to the object ['full_reverse' (2) In this case, a destination for ['full_reverse' (1)] is ['full_reverse' (2)].

Since an explanation can be described in a link, the description "problem: if the elements of an input list are an item or atom, there are no problems, but if they are a list, there may arise problems" should be given. Furthermore, in the "note: ['full_reverse' (2], "input elements will be determined by the predicate "atomic" " may be added.

A technique link and an intention link are set as links in the object ['full_revers' (2)] in itself, and "list, determination using a determinative predicate" and "reverse" are set in the respective links as destinations. In this case, the "determination using a determinative predicate" 36 of FIG. 3 is newly added as a destination. However, this program ['full_reverse' (2)] cannot yet perform necessary processing "if the elements of an input list is also a list".

Thus, the predicate 'is_list' to determine whether the elements of a list are a list is retrieval from the determinative predicate 36. If the elements of the list is a list, it can be presumed that the elements of the list may be reversed by the predicate 'reverse' and that the reversed elements may be added using 'append'.

The ['full reverse' (3)] is shown when a list is in a list as follows:

(1) full_reverse ([ ], [ ]).
(2) full_reverse ([H|T], L):- atomic (H),
full_reverse (T, TT), append (TT, [H], L).
(3) full_reverse ([H|T], L):
is list (H), reverse (H, HH),
full_reverse (T, TT), append (TT, HH, L).

These are recorded as the following objects. This program is made on the basis of the program ['full_reverse' (2)], so that a link of the "development" is newly set from the object ['full_reverse' (2)] to the object ['full_reverse' (3)], and a destination is set as

['full_reverse' (3)]. Since the program 'is_list' is used for reference, the link "reference program" is set and a destination is set as a predicate name "'is_list'". If there is also a list in the list in this program, for example, if there is a third list [a, b] such as [[[a,b], c]d, e], [a,b] is not reversed and the resulting list is [e,d[c,[a,b]]]. As an explanation of the link, the description "problem: if the elements of an input list are a list which has also test as an element, processing is not well performed" is given. In addition, "Note: ['full_reverse' (3)], the determination of the input elements is made using 'is_list' in addition to the predicate 'atomic'" may be added.

A technique link and an intention link are set as links in the object ['full_reverse' (3)] in itself, and "list, classification according to determinative predicate" and "reverse" are set as destinations in the respective links. Since the program ['full_reverse' (3)] does not operate well "if an input list has a list of list in its elements", the user will understand that some other technique must be used in the programming process. Since the program structure includes classification according to conditions and has a recursive structure in which the same technique is used twice, any other program is retrieved and discovered as an example on the basis of the keyword "conditional recursion" 38 of FIG. 3.

The program discovered as being used for program development is shown as follow:

```
1st clause: flatten ([ ], [ ]).
2nd clause: flatten ([H|T], L): -
atomic (H), flatten (T, TT),
append (HH, TT, L).
3rd clause: flatten ([H|T], L): -
flatten (H, HH), flatten (T, TT),
append (HH, TT, L).
```

By reference to these programs, it will be understood that in the program using "conditional recursion" 38, it is necessary to recursively process an argument as an object for determination, and that the third clause is automatically called out even if the elements are not determined using 'is_list' if it is not 'atomic'. By replacing the "flatten" mechanically with "full_reverse" on the basis of the discovered program, the following program ['full_reverse' (4)] can be made:

```
full_reverse ([ ], [ ]).
full_reverse ([H|T], L): -atomic (H),
full_reverse (T, TT), append (TT, [H], L).
full_reverse ([H|T], L): -
full_reverse (H, HH),
full_reverse (T, TT),
append (TT, HH, L).
```

Set in this program are "reverse" as an intention link, "list, classification according to determinative predicate, conditional recursion" as a technique link, and "flatten" as a reference program link in the sense that the program "flatten" is referred to. In this case, "conditional recursion" as a destination for the technique link and "flatten" as the reference-program name add.

Which program the development link is set from may be considered as follows. In the course from the program ['full reverse' (3)] to ['full reverse' (4)], using the program "is_list" for reference is abandoned, so that the destination to which the program made at that time links becomes the program ['full_reverse' (2)] substantially.

Since the program ['full_reverse' (4)] has "conditional recursion" as a technique and "flatten" as a reference program for the destination compared to ['full_reverse' (2)], the program ['full_reverse' (4)] can be regarded as being developed on the basis of ['full_reverse' (2)].

The development link to the ['full_reverse' (4)] is set from ['full_reverse' (2)]. Since the development link is the same as the development link to the ['full_reverse' (3)], no description on problems with the links will not be given, but, as remarks, the ['full_reverse' (3)] produces an erroneous output if the elements are a list of list in a list. Thus, in ['full_reverse' (4)], "conditional recursive technique is used by reference to the program 'flatten' in addition to the predicate 'atomic'" may be added.

Figure 8A:
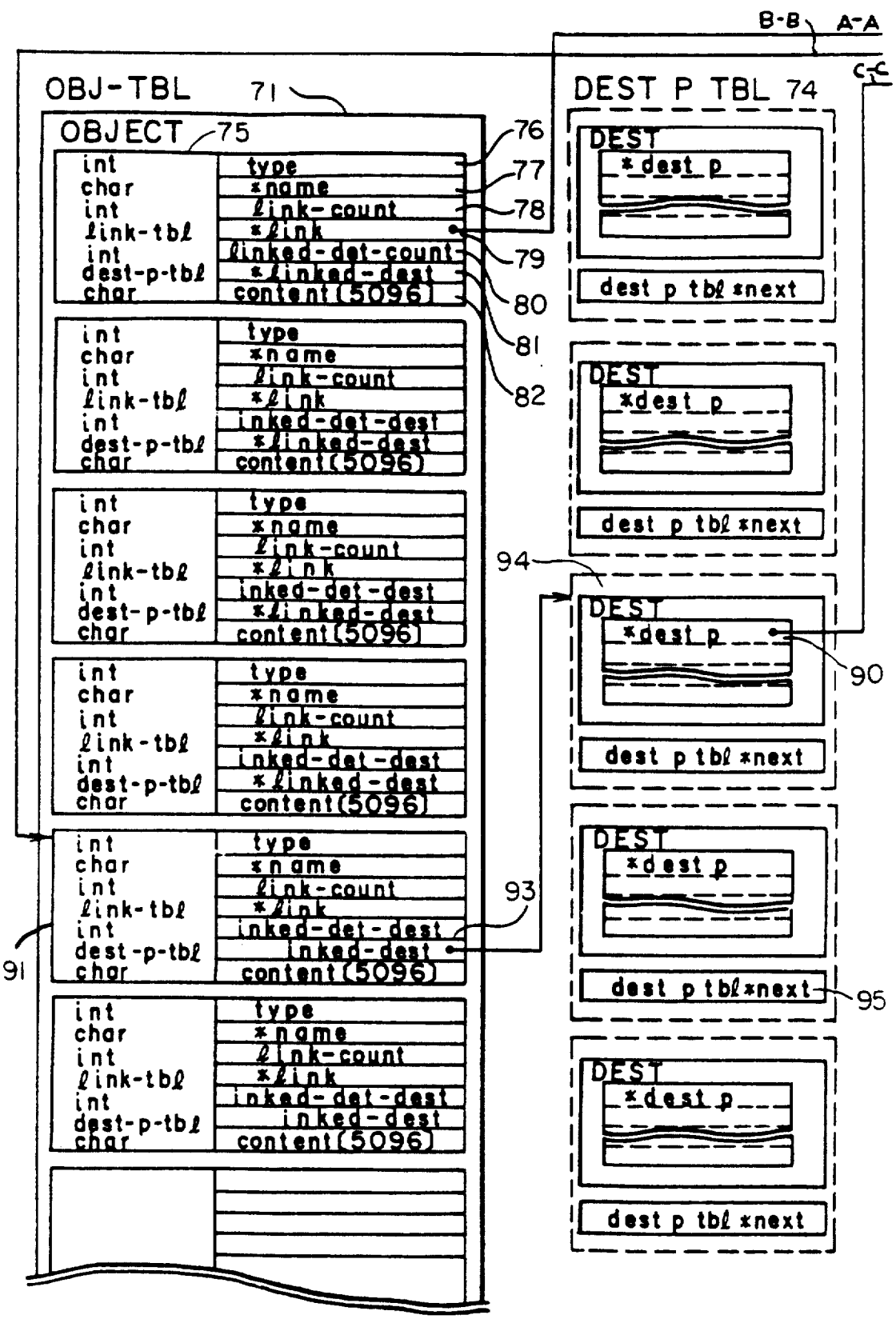
FIG. 8 illustrates the structure of memory areas storing various data in one embodiment of the present invention.
Figure 8B:
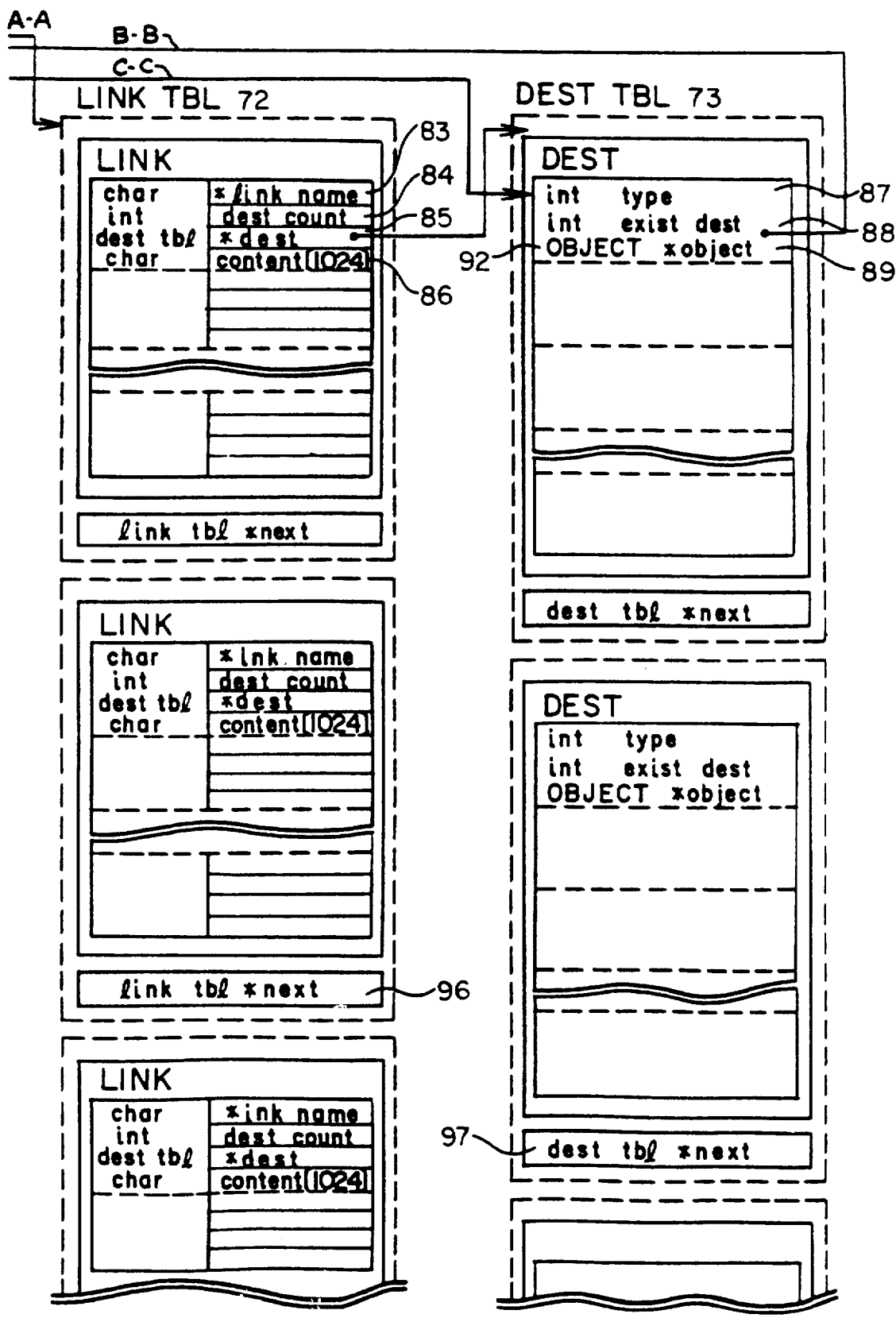

The structure of software to realize such function will now be described in more detail. FIG. 8 is a schematic of a storage area storing various data in one embodiment of the invention. The storage area in the particular embodiment is divided into four: namely, an object table (OBJ_TBL) 71, a link table (LINK_TBL) 72, a destination table (DEST_TBL) 73 and a destination pointer table (DEST_P_TBL) 74.

The object table 71 is a storage area which handles source code files, technique data files and intention data files of individual programs using a single data structure of an object.

The individual data areas 75 of the object table 71 are each divided into seven columns 76 to 82. In each column, a type 76 is a type of object. A type 1 is "a source code file", a type 2 is "a technique data file", a type 3 is "an intention data file" to classify kinds of objects. A name 77 denotes the name of the object, a link_count 78 denotes the number of links set from the object, a link 79 denotes a pointer to use link data, a linked_dest_count 80 denotes the number of destinations using the object. A plurality of destinations derives from a single link. A linked_dest 81 denotes a pointer to destination data pointing to its object as a destination, and a content 82 denote the contents of the object. In the case of a source code file, the source code and comments are described in the content 82 while in the case of intention data and technique data, text data such as matters or problems arose when the object was developed and a process for solving the problems is described in the content 82.

By retrieving text data using the link and displaying the data, the course of program development can be understood clearly. A link table 72 is an area for storing data on links set from the respective objects and the data stored are used by tracking a pointer (link) 79 pointing to the area head from the object. The individual data areas constituting the link table 72 are divided into four columns.

In each column, a link_name 83 denotes the link name, a dest_count 84 denotes the number of destinations linked, a dest 85 denotes a pointer pointing to the area head for the destination data, a content 86 denotes the contents of the link where problems and notes are described. The number bracketed in the "content" item denotes the capacity of a row of characters.

The destination table 73 is an area which stores data on destinations related by the respective links and that data is accessed by using a pointer (dest 85) pointing to the area head of the destination data from the link data. Individual data areas constituting the destination table are divided into three columns 87, 88 and 89.

In each column, a type 87 denotes the type of a destination and is used like the type of the object. An exisl_dest 88 denotes a flag indicative of whether an object pointing to a destination exists or not, an object 89 denotes a pointer pointing to a data area 91 of the object as a destination. As one of the program managing processes, a content area may be provided at the end (next to 89) of each of the blocks constituting DEST TBL 72 to write therein a process for solving the problems instead of writing into the content of LINK TBL 72 a process for solving problems with the program from which the link is set.

This reduces the number of conditions for diverging to destinations when the number of those destinations is large to thereby facilitate program management.

The destination pointer table 74 is a storage area having data on a reverse link from each object destined for a destination object pointing to the former object as a destination. A dest_p 90 denotes a pointer pointing to a data area 92 for destination. The destination pointer table 74 is accessed by tracking a pointer pointing to the head 94 of the address area from a linked_dest 93 in the data area for the object.

Pointers 95 to 97 at the end of the respective tables allocate and designates the next tables if there are no empty spaces in the respective tables.

FIG. 9 is a flowchart showing a program development and setting a link to related data and a development link.

First, a name is attached to the developed program, the programming number is updated and the program is edited (131). In developing the program, it is checked whether other data is referred to (132). If yes, a link is set to the data referred to (133), and conversely, a link to return to the developed program from the data referred to is also set (134). This is called a reverse link which is set to delete the link to the data referred to which has become unnecessary from the developed program. A development link to the file or stage program preceding the current edited program is set (135). Under such conditions, it is checked whether the program operates properly or not (136). If not, the program is corrected and control returns to step 131 to re-edit the program. Such repetition is performed until the program operates properly.

Figure 10A:
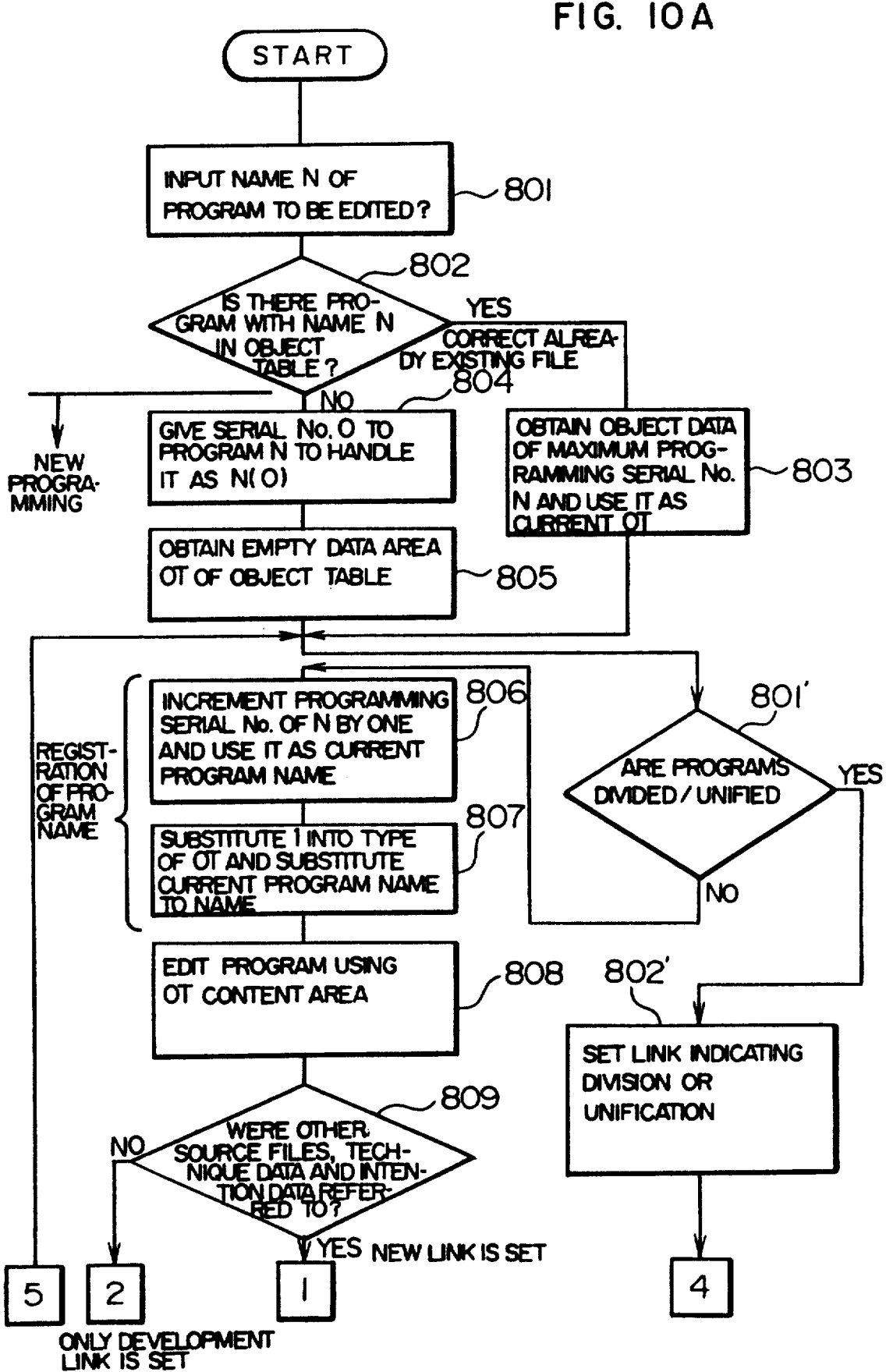

The details of steps 131 and 132 are shown in FIG. 10A. In the development of the program, the source code is made and a link to the related data is set. This operation is performed manually. When the course of programming is recorded using a recording area of a structure shown in FIG. 8, the name N of a program to be edited is input as shown in FIG. 10A (801), and the editor is opened. The programming serial number is attached to the program name, so that when the program is made in the course of programming is identified, which is not open to the user.

If the name of the input program is for the already existing file (802), the program having the maximum programming serial number is the latest edited program among programs having the same name (803).

If the input program is a newly made one and has no appropriate program name, the programming serial number is put to 0 (804).

When the preceding programming number is thus obtained, one empty data area (hereinafter referred to as OT) in the object table 71 used for future edition (805).

It is then determined whether a program is divided and managed or whether a plurality of related programs is united into one, which is then managed (801'). If nothing is done, control passes to step 806, but if yes, a link is set which indicates division or unification (802'). If the answer is no at step 801', the manufacture serial number on a file to be edited next is given as the serial number on the latest edited file plus one (806), the number '1' indicating that the object is a source file is recorded in the first column type of the secured OT, and the name of the program to which the current serial number is attached is inserted into the second column name (807). A program is then edited using a seventh column content (808). When edition has temporarily completed, data on the program development process from the time when data on the previous program development process was stored to the present time is stored.

The development process is then analyzed which includes which program was referred to in the course of programming, which programming technique was used and which intention brought about such program (809).

As a result, if any data is referred to, it is set as a link. This process corresponds to steps 133 to 135 of FIG. 9, and their details are shown in step 818 of FIGS. 10B to 10C. Namely, the OT used in the present work is checked to determine whether the link table 72 is laid out (810). If not, a link recording area is secured and the head address of the link table 72 is substituted into the fourth column link of the OT (811) in order to allow the same to be accessed from the OT.

The laid-out link table 72 is retrieved to check whether the link name to be set is already registered (812).

As a result, if the link name has not yet been registered, an empty data area in the link table 72 is allocated and registered in the first column link_name 83, the destination table 73 is allocated and the head address is inserted into the third column dest 85 (813) for allowing access.

When the identity of the link is thus secured, the fourth column content 86 is used to describe problems, comments, etc.

Furthermore, after the destination table 73 is secured, an empty area (hereinafter referred to as a DT) in the destination table is secured for registering a link target (814). Data on the type of the destination object is substituted into the first column type 87 of the DT, and the address of the data area of the object which will be a destination is substituted into the third column so as to allow access from the DT. A second column exist_dest 88 is a flag indicative of the presence of the identity of the destination. If the flag is set, the column 88 is ON, but if the destination is deleted, the flag is set to OFF using a linked_dest pointer 93 (815). The linked_dest pointer is used to set to OFF the flag exist_dest on destination data in which the object is used as a destination when the destination is deleted, and points to a DT.

Figure 10C:
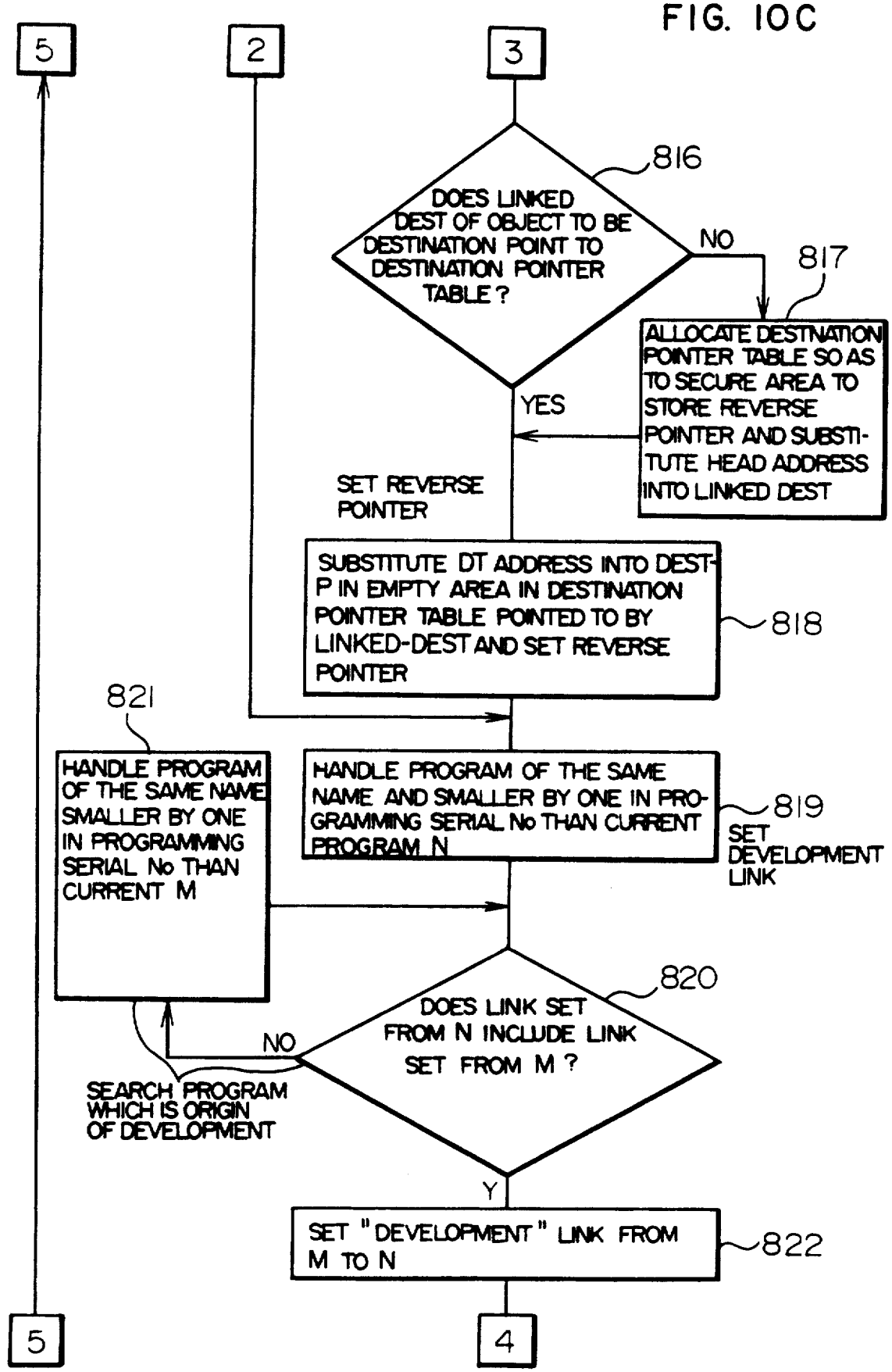

The process for setting the link_dest pointer is shown in FIG. 10C. Data on the object to be linked as a destination at present is searched, and it is checked whether the destination pointer table 74 is laid out (816) in order to set a reverse pointer to return to the original program because the pointer is a bilateral one. If not, an area to store the reverse pointer is secured and the head address of the destination pointer table 74 is substituted into the sixth column linked_dest 93 of the link target object (817).

After the table 74 is thus secured, the address of a DT is substituted into the dest_p 90 of the empty data area to set the reverse pointer in order to access the second column exist dest 88 of the DT from the object (818).

As just described above, after a link is set to the data referred to in the programming process, a development link indicative of the development process is set (819 to 822).

The program data used in the development course increases in quantity as the development advances, so that they are compared sequentially with the previously made programs to search a program which includes the same link as that to the program data referred to (819 and 820), and a development link is set from the appropriate program to the current edited program (822). The process for setting the link is performed as in steps 810 to 818. For example, if there are a program A having program data (1), (2) referred to and a program B having program data (1), (2), (3), and the developed program has the data (1), (2) and (4), a link to the developed program is caused to extend from the program A having the common program data (1) and (2). A link is not set from the program B because the data (3) is not common and not in relation of inclusion.

The problems with the original program as well as a process for solving problems with the current edited program can be described in the fourth column content 86 of the link table 72 for the development link. The process for solving the problems can be described in the seventh column content 82 of pointer 91 pointing to the link object in the object table 71 as the link destination. If the current edited program includes divisions of the original program or the unification of the original programs, the "division link" and "unification link" indicative of that fact can be set from the previous program as in the steps 810 to 818.

Figure 10D:
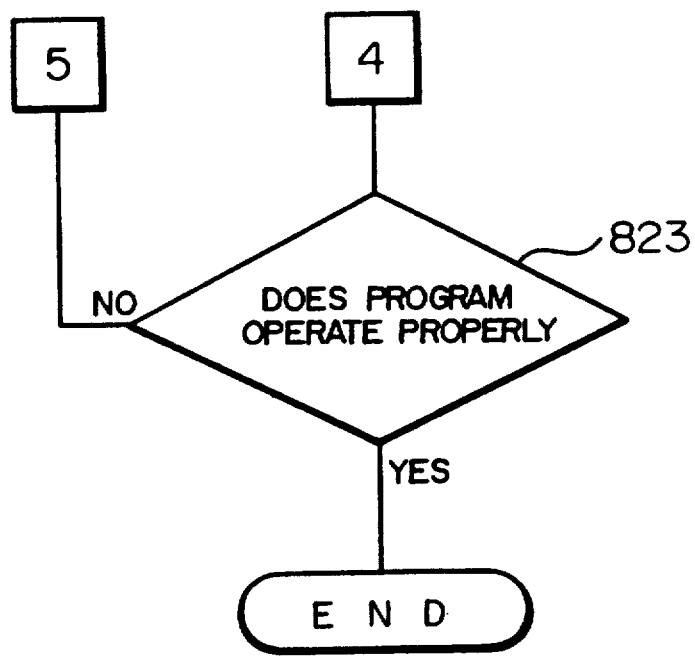

The above process is one section for programming, and it is checked whether the program operates properly (823) as in FIG. 10D which corresponds to step 136 of FIG. 9. If the program is determined to operate properly, control ends while if not, control returns to step 806 to repeat the same process.

As just described above, the course of program development can be recorded by comparing the link setting and the relation of inclusion of the set link for the programs made in the course of program development.

In the particular embodiment, a process for indicating program data will now be described. In the particular embodiment, the entire structure of various program data is indicated by a graph structure having nodes as the name of data and links indicative of the relationship between the nodes. A pointing device such as a mouse may be used to designate a node or a link to change its displayed color to indicate its designation to thereby allow the use of the object designated.

The data to be analyzed as a graph structure varies depending on the program data thereof. In the case of technique data and intention data, the class structures stored according to their relationship are analyzed while in the case of a source code file, a program development graph structure is analyzed, which includes its initial source code file as a top node and the latest edited source code file as the bottom, in accordance with links indicative of the development process such as development link and unification and division links.

The processes for indicating these graph structures can be handled equally in a system for indicating nodes and links therebetween so as to represent parent-child relationship.

Figure 11A:
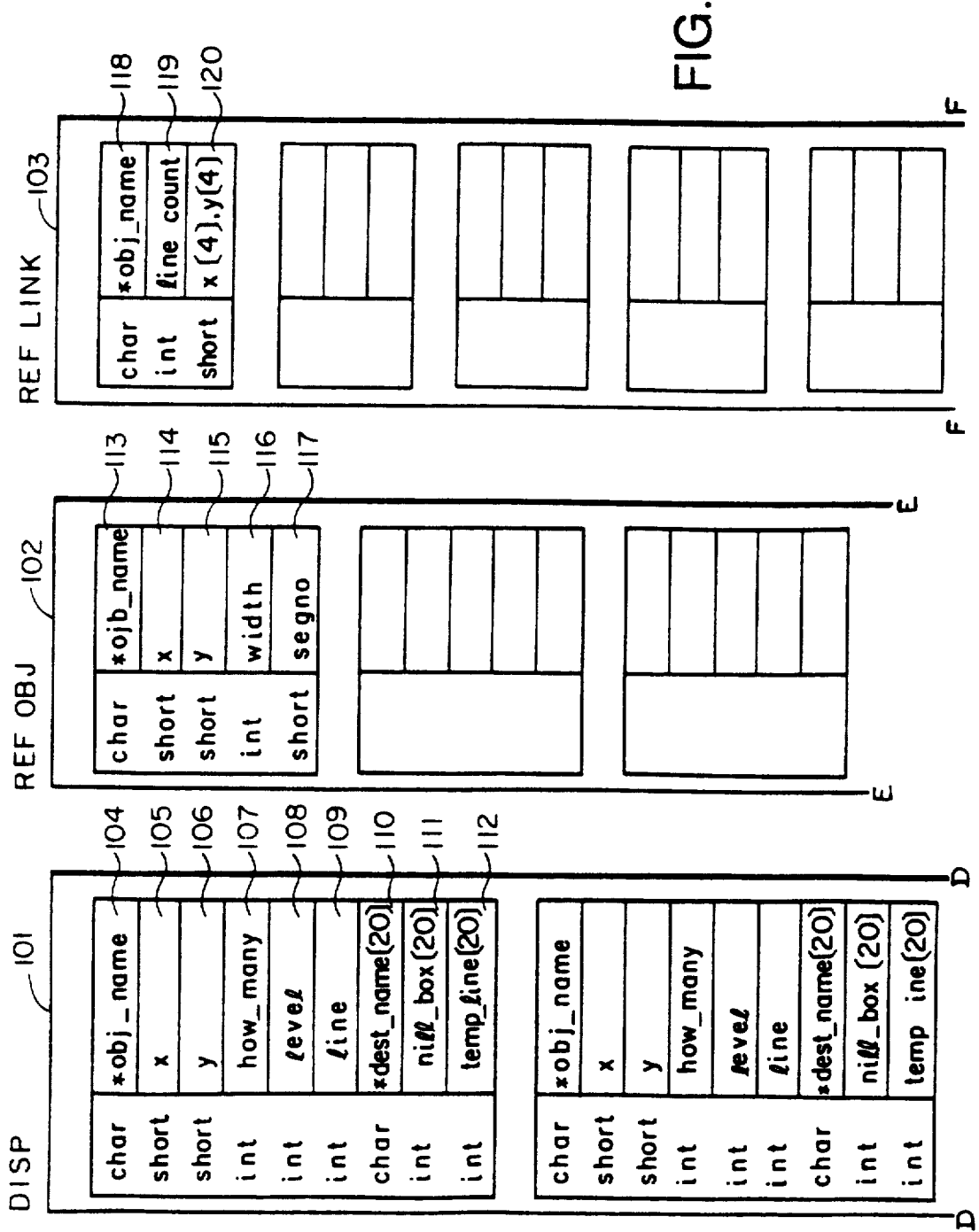
FIG. 11 illustrates the structure of a memory area to represent the entire structure of program data in one embodiment of the present invention.

FIG. 11 illustrates the structure of a storage area to indicate the entire structure of program data in one embodiment of the present invention as the graph class structure to be shown in FIG. 12. The storage area indicates the entire structure of data on the respective programs and stores various data to change color indication according to designation.

This storage area is divided into three portions, namely, an object display data area (DISP) 101 to receive data to indicate a node, an object reference data area (REF_OBJ) 102 to refer to a node name to identify the same when it is designated on the display screen, and a link reference data area (REF_LINK) 103 to refer to a link to identify the same.

The data area constituting DISP 101 is divided into nine columns. A first column obj_name 104 represents the name of an object to be a node, a second and a third columns x, y 105 and 106 represent the coordinates on the screen of a node to be displayed, a fourth column how_many 107 represents the number of destinations linked, a fifth column level 108 and a sixth column line 109 represent the display position by a row and a column in the entire display object, a seventh column dest_name 110 represents in array the name of an object as a destination, an eighth column nill_box 111 and a ninth column temp_line 112 respectively represent the numbers of nodes and rows of dummies set to prevent superposition of display lines when links to the respective destinations are displayed.

In the particular embodiment, display is made such that a link connecting a node and another node is prevented from intersecting another link. The bracketed numerals in the columns 110 to 112 represent the maximum number of characters.

The data area constituting the REF_OBJ 102 has five columns. A first column obj_name 113 represents the node name, a second and a third columns x, y 114 and 115 represent the coordinates of a node displayed on the screen, a fourth column width 116 represents the displayed width of the node on the screen, and a fifth column segno 117 represents the number of a segno used in display.

The data area constituting REF_LINK 103 includes three columns. A first column obj_name 118 represents the name of an object setting the link, a second column line_count 119 represents the number of lines used for link display, a third column x, y 120 represents the coordinates of a line segment displayed and allows up to four coordinates to be recorded. The number of line segments for a single link display requires only three at most.

Figure 12A:
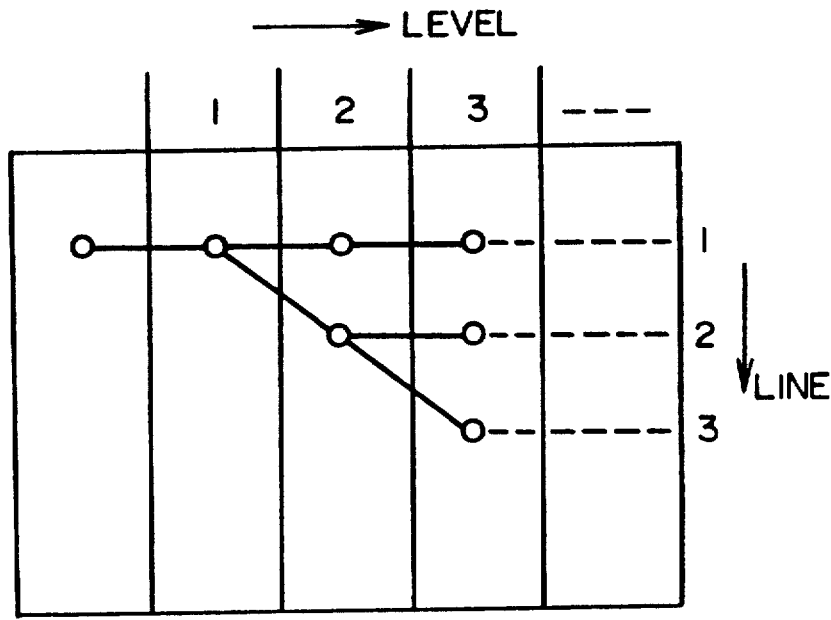
FIGS. 12A and 12B illustrate a process to indicate the program data of a graph structure as a network.
Figure 13A:
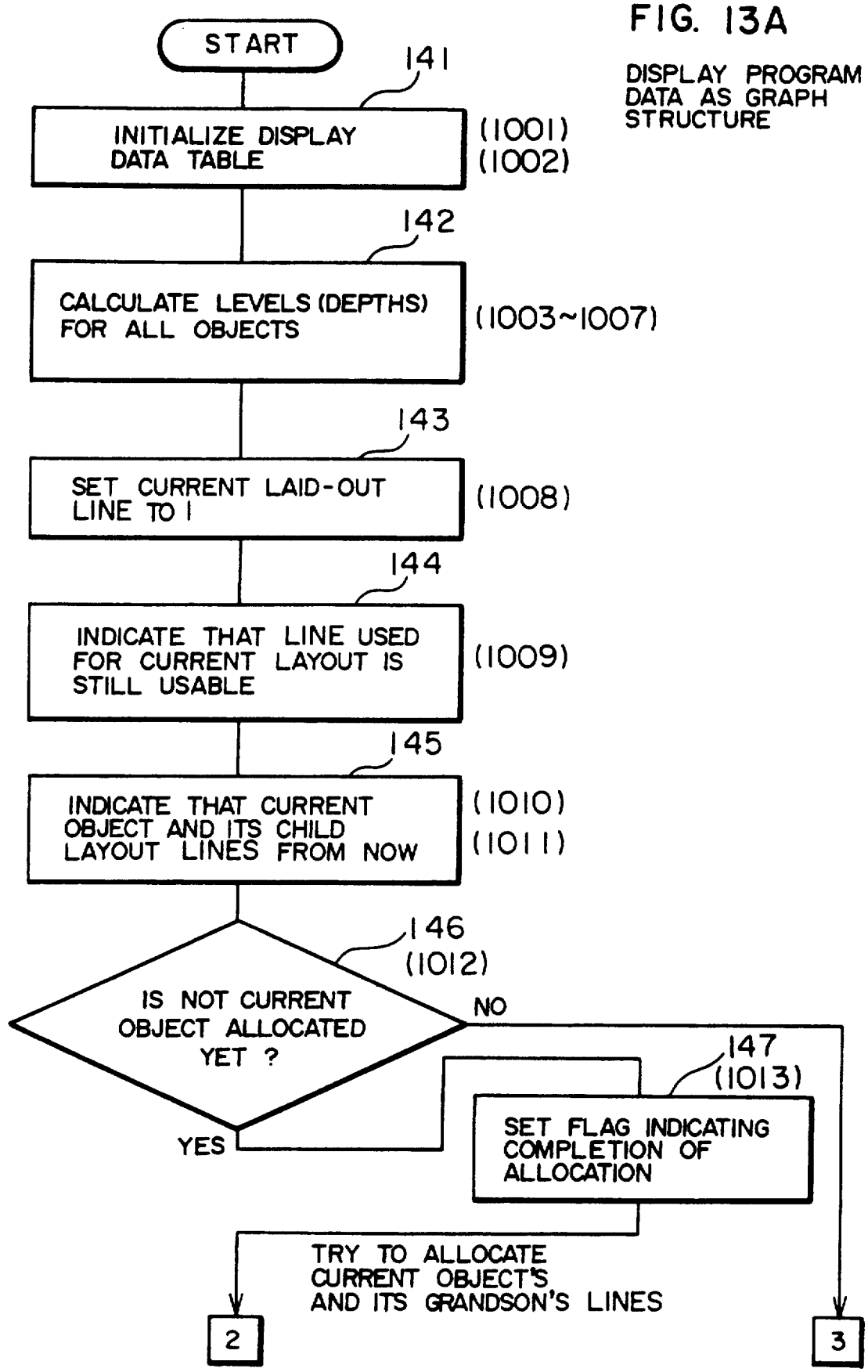
FIGS. 13A to 13C are flowcharts illustrating the display of the graph structure of program data in one embodiment of the present invention.
Figure 13B:
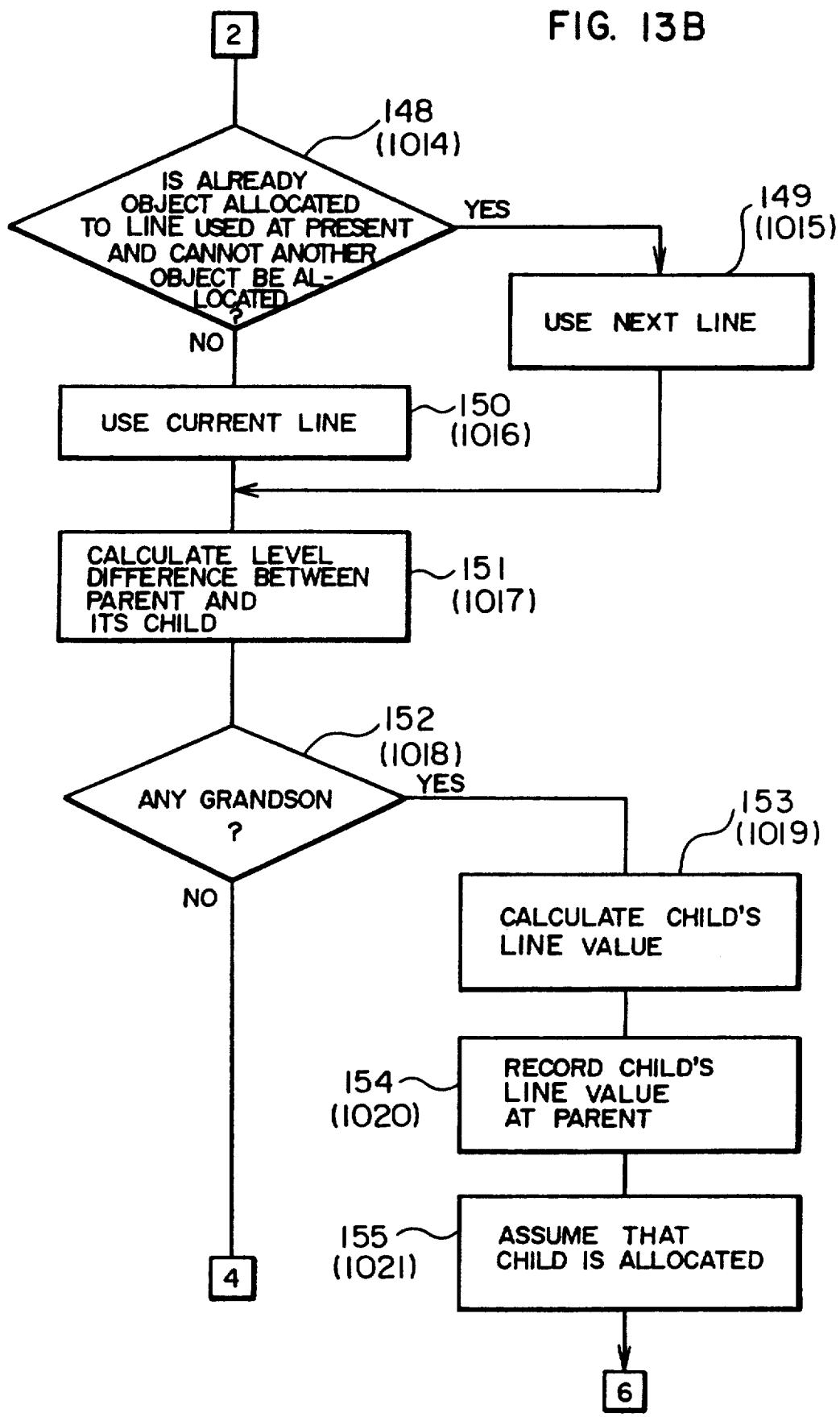
Figure 13C:
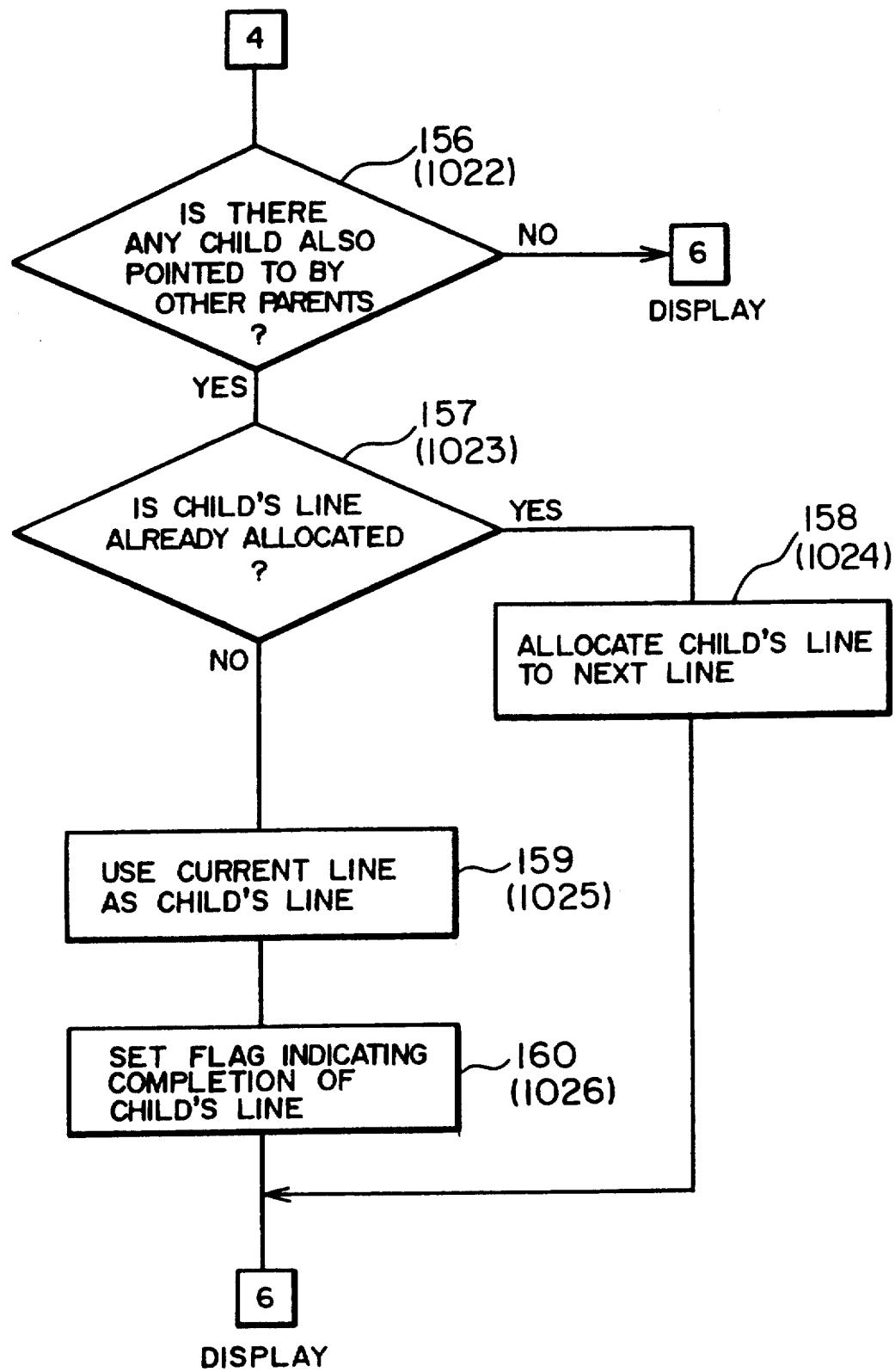

FIGS. 13A to 13C are a flowchart illustrating the structure of data on each program in one embodiment of the present invention as a graph structure shown in FIG. 12A. The bracketed numbers 1001 to 1020 illustrate corresponding steps of FIGS. 14A to 14D flowcharts which shows FIGS. 13A to 13C in more detail. First, a table is initialized in order to prepare to calculate display data and store the data therein (141). Levels indicative of the respective depths of the display positions of nodes on all the objects are calculated (142). A line to be laid out at present is set to 1 (143). A flag is set which indicates that the line to be used for layout at present is still usable (144). The current parent or object and its child (current destination) illustrate that they will layout a line from now (145). It is checked whether the line of the current object is not yet laid out (146). If yes, it means that there is no line laid out, so that the lines of the current object and its child are laid out and a flag is set which indicates the completion of such layout (147). If no, all the lines of the objects are already laid out, so that this fact is displayed.

Figure 12B:
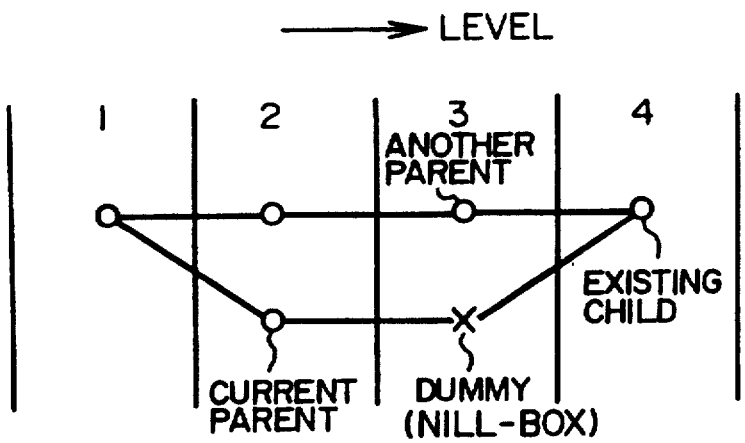
Figure 14A:
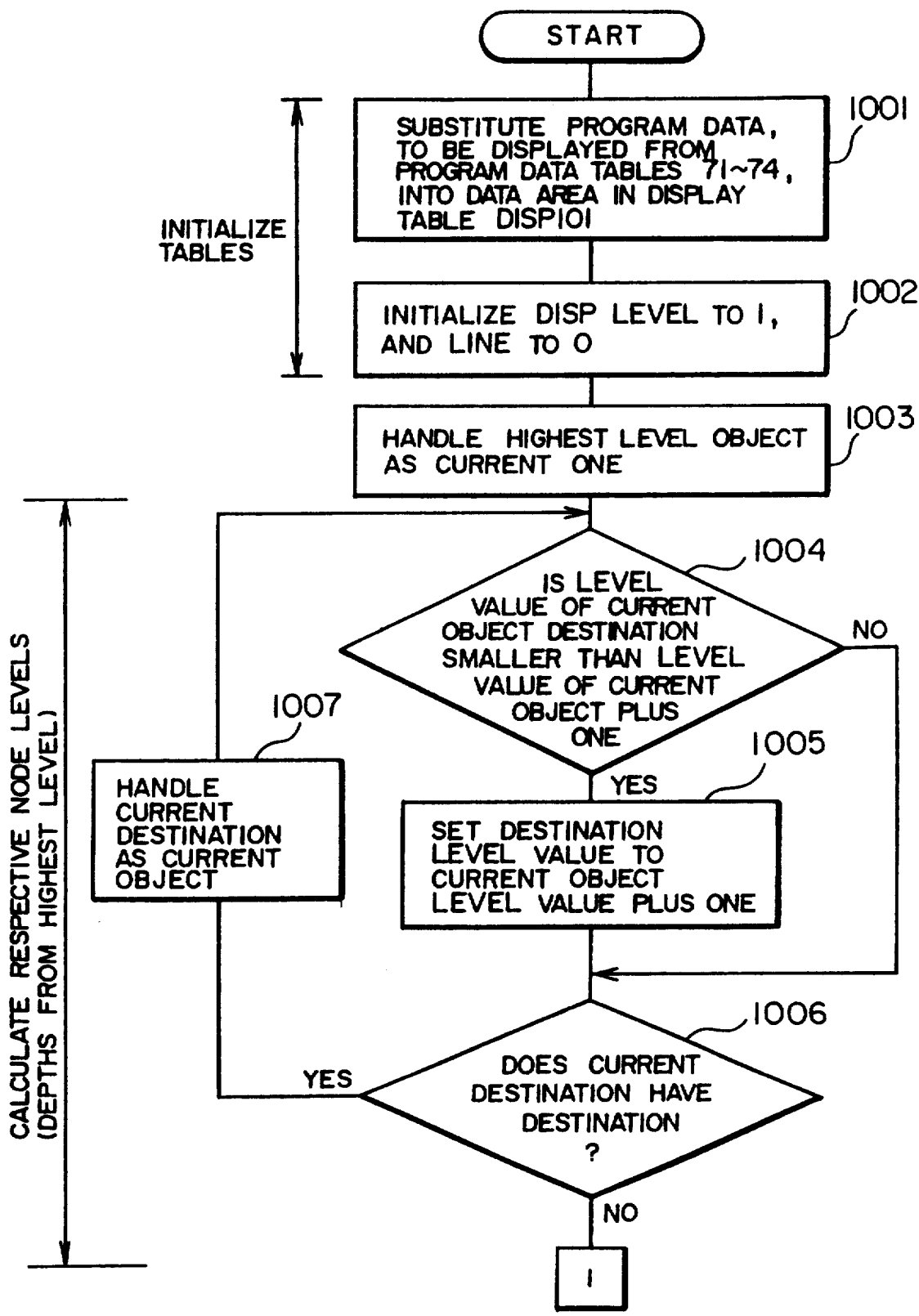
FIGS. 14A to 14E are flowcharts illustrating the flowcharts of FIGS. 13A to 13C in more detail.
Figure 14B:
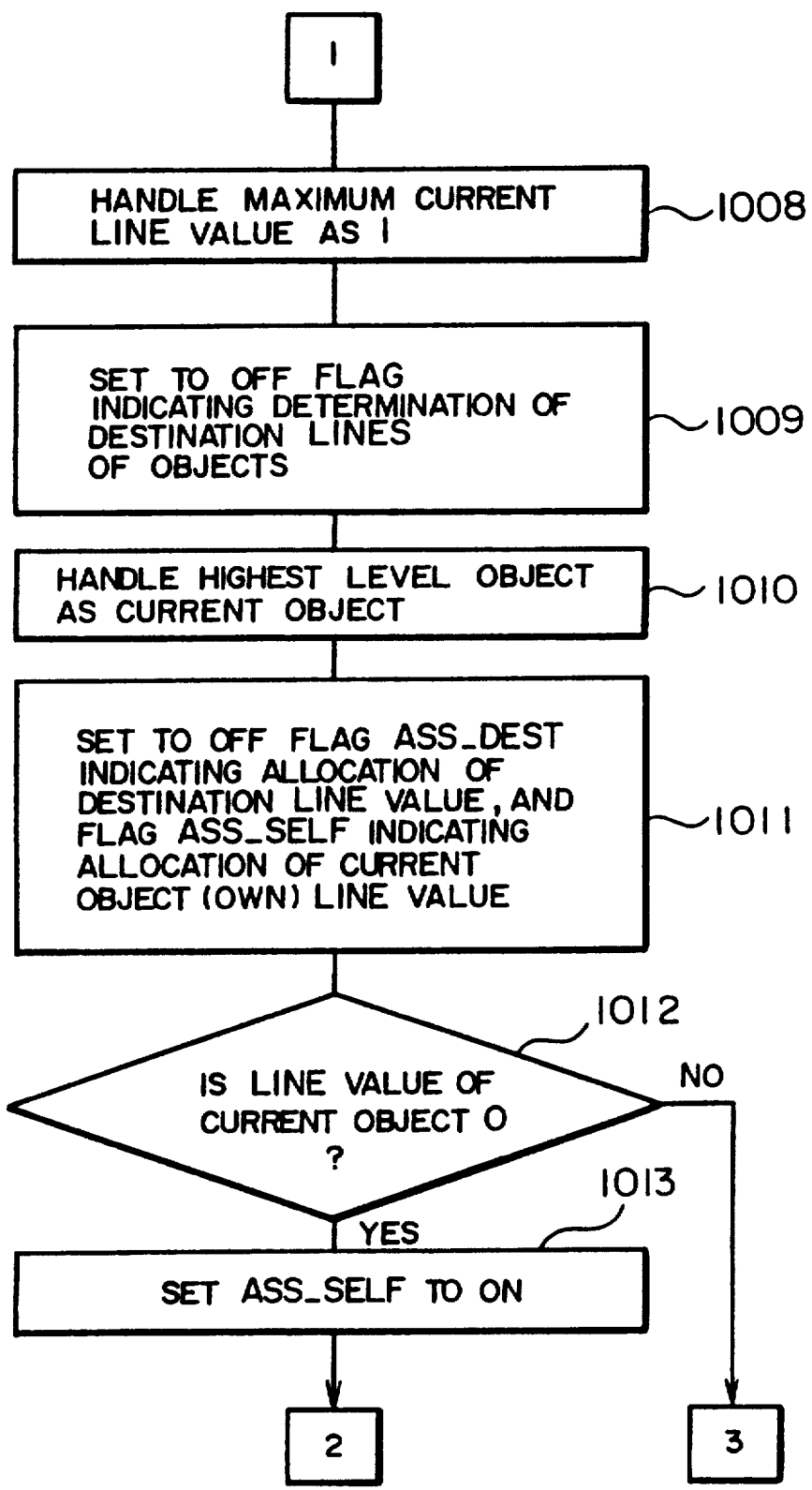
Figure 14C:
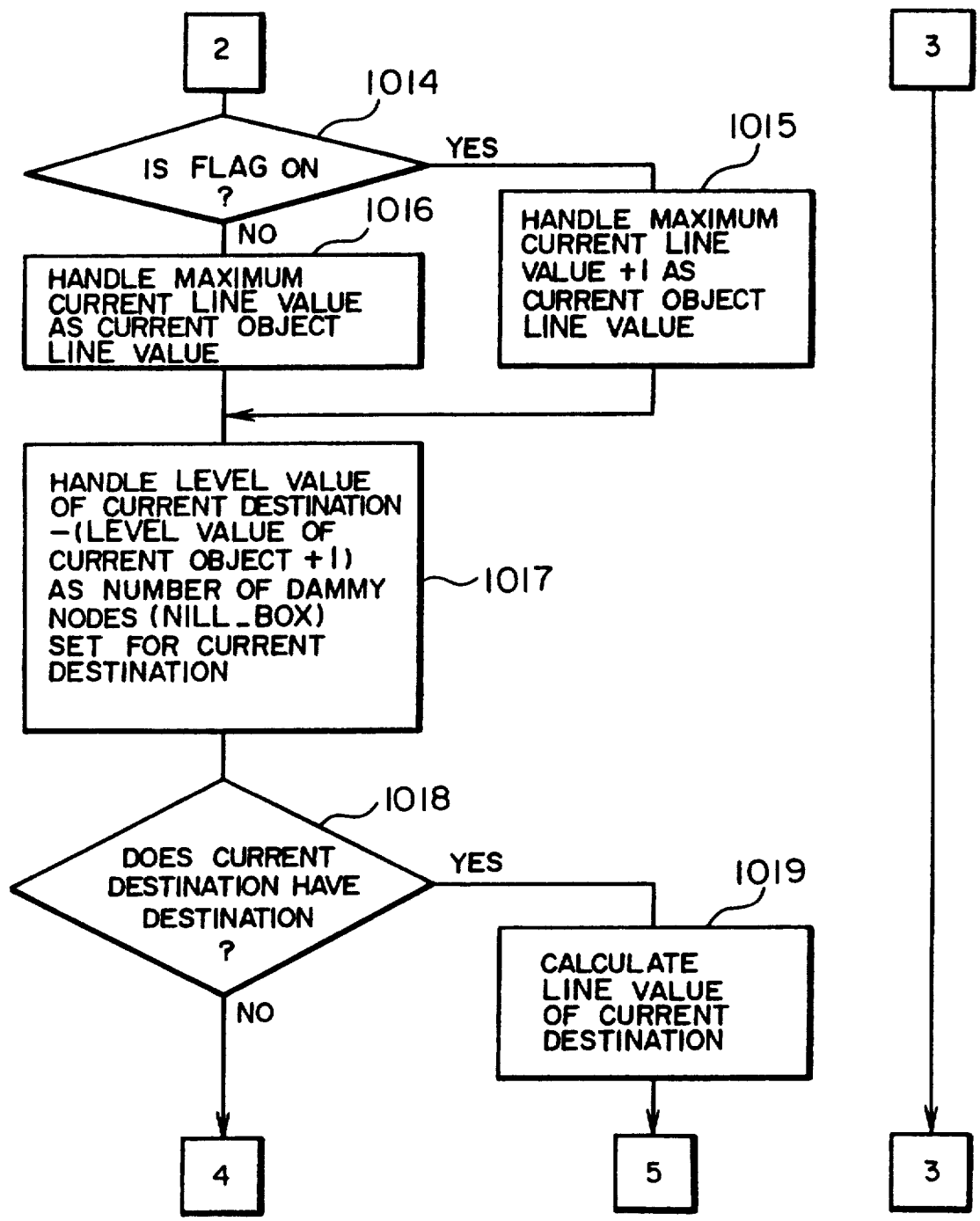
Figure 14D:
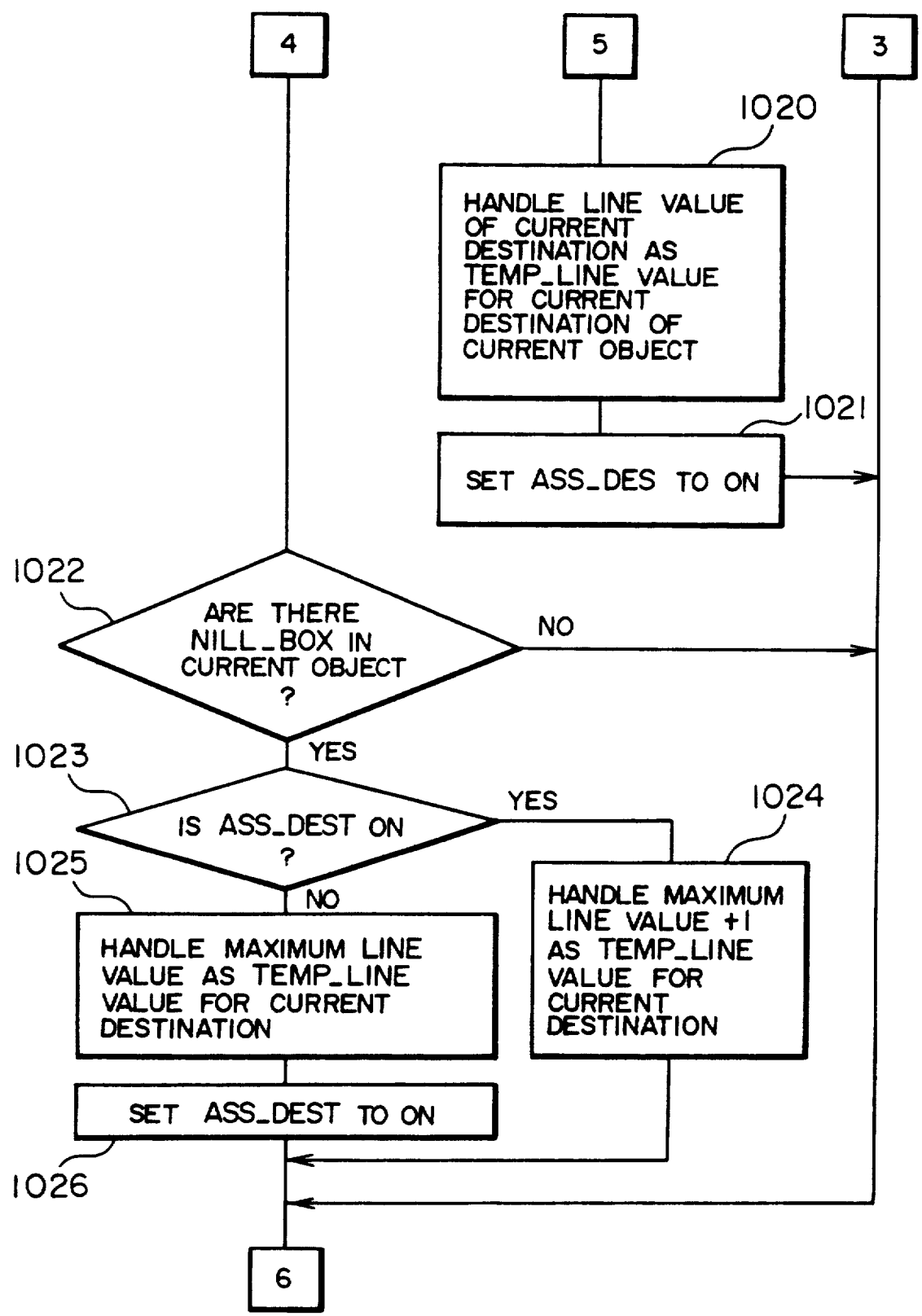
Figure 14E:
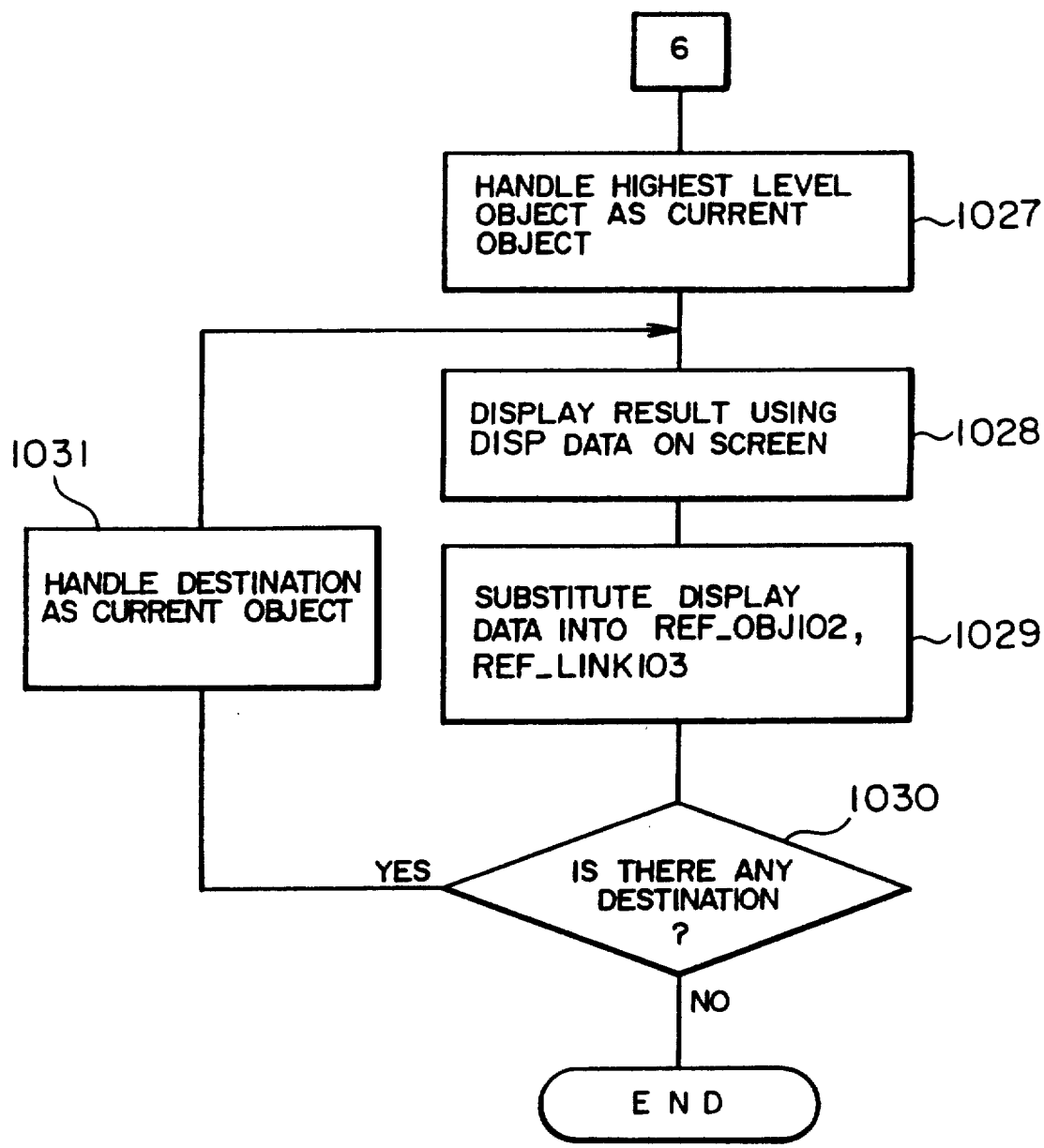

Control then passes to the flow of FIG. 13B, and it is checked whether an object cannot be laid out any longer in the line of interest at present (148). If yes, the next line is used (149). If no, the current line is used (150). If the child is not at an adjacent lower level, but at a further lower level, which will occur when the current child is the child of another parent as shown in FIG. 12B, a single dummy node (X) is put at an intermediate level such that links do not intersect. To this end, the difference in level between the parent and child is calculated (151). It is then checked whether there is a grandson (a destination referred to from the current destination) (152). If yes, the line value of the child is calculated (153) and recorded in the parent (the temp__line of FIG. 11) (154). A flag is set which indicates allocation of the child (155). Control then passes to the flow of FIG. 13C where it is checked whether there is a child pointed to from another parent (156). If yes, it is checked whether the line of the child is already allocated (157). If yes, the line of the child is allocated to the next line and displayed (158). If no, the current line is allocated to the child line (159), and a flag indicative of such allocation is set (160). Thus the allocation of all the lines is completed and control passes to the flow of FIG. 14E. The details of the respective steps of FIGS. 13A to 13C are shown in FIGS. 14A to 14D.

In the particular embodiment, if the structure of data on the respective programs is displayed using the structure of the storage area shown in FIG. 11, the program data displayed is read from the tables 71 to 74 of FIG. 8 into the display data table DISP 101 of FIG. 11 (1001). At this time, the object name is inserted into a first column obj__name 104, the number of linked destinations is inserted into a fourth column how__many 107, and a row of destination names is inserted into the seventh column dest__name 110. Numerals 1 and 0 are substituted into the fifth column level 108 and sixth column line 109, respectively.

After such initialization of the table, the level values of the respective objects are calculated (1003 to 1006). The level values represent the corresponding depths of the classes. The current object is regarded as a parent and the current destinations are regarded as children. If the parent has a child, the child level is set to the current object level +1. The same processing is repeated for that child. If an object having no child is reached, processing for return to 1 is performed.

The highest level object is used as the current object (1003). If the destination level of the current object is lower than the current object level (1004), the destination level value is set to the current object level value +1 (1005).

It is then checked whether there is a destination in the current destination (1006). If so, the current destination is used as the current object (1007) and similar processing is repeated (1004 to 1006). By such processing, the respective node levels or the respective depths from the highest level are calculated. The line values of the respective objects are then calculated.

The number of lines used is defined as "the maximum line value". The current maximum line value is set to 1 (1008), and a flag is set to OFF which indicates the allocation of a line to each object destination, indicating that it is necessary to calculate the line of the destination (1009).

After such initialization, the highest level object is used as the current object (1010), and a flag ass__dest indicative of the allocation of the destination line value of the current object and a flag ass__self indicative of the allocation of the line value of the current object are turned off to thereby indicate that the current object and its child have not yet allocated lines (1011).

It is then checked whether the line value of the current object is allocated (1012). If not, the line value is calculated (1013 to 1026). The flag ass__self is set to ON to thereby indicate that the current object line value has been calculated (1013). It is then checked whether the destination line value has been already allocated and whether a new object can not be allocated (1014). If yes, the current maximum line value +1 is set to the line value of the current object and the following line is used (1015). If not, the current maximum line value is set to the current object line value (1016).

The number of dummy nodes (nill__box) set and used to prevent the superposition of links in display is calculated (1017). As shown in FIG. 12B, the level value of the child (current destination) minus {the parent (current object) level value +1} is used as the number of dummy nodes (nill__boxes) set for the current destination.

The temp__line value which is the line value to be bypassed is calculated (1018 to 1025). This means that when a child is viewed with an object as the parent, the line value indicative of which line the child is allocated to is the temp__line value.

If there is a destination in the current destination (1018), the line value of the current destination is calculated using the process of steps 1013 to 1026 (1019), and the resulting value is used as the temp__line 112 value for the destination of the current object (1020), and a flag ass__dest indicative of the completion of calculation of the destination line value is set to ON in order to indicate that the allocation has been completed (1021).

If there is a child pointed to by another parent, namely, if there is no destination but a nill__box in the current destination (1022) and a destination value is allocated (1023), the destination value is allocated to the line lower by one line from the initial line already allocated in order to prevent the intersection of links. Thus, the current maximum line value +1 is used as the temp__line value for the destination of the current object (1024). If the destination value is not allocated, the current maximum line value is used as the temp__line value for the destination of the current object in order to use the current line as a child line (1025), and a flag ass__dest is set to ON, which indicates that the destination line as a child has been calculated and allocated (1026).

Thus the respective levels and line values of the objects are calculated and then displayed (1027 to 1031). The highest level object is used as the current object (1027), one segno is allocated to each object by using the calculated DISP data and the result is displayed (1028). In this display, the respective objects and display data on the links set from the objects to the destinations are substituted into REF__OBJ 102 and REF__LINK 103, respectively. The current object is replaced with the destination to display all the objects (1030, 1031).

A process for designating displayed data on the screen, changing the displayed color of its object or link and displaying its contents will be described.

Figure 15:
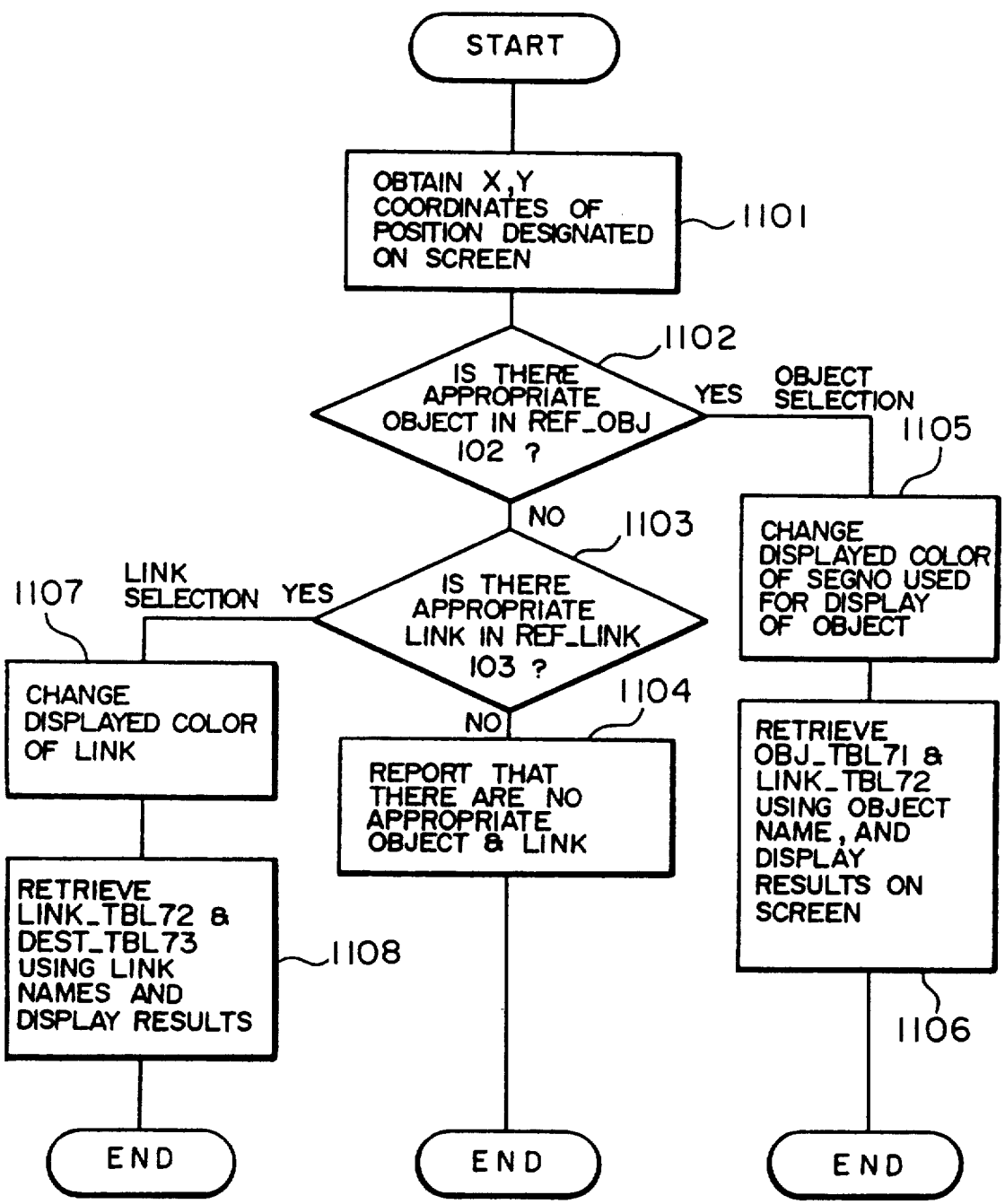
FIG. 15 is a flowchart illustrating retrieval of desired program data from the entire structure of displayed program data in one embodiment of the present invention.

FIG. 15 is a flowchart indicative of retrieval to a desired program from the entire structure of the program data displayed in one embodiment of the present invention. In the particular embodiment, the displayed data is designated on the screen, the displayed color of the object or link thereof is changed and the retrieved contents are displayed. If any is designated on the screen, the coordinates of its position are obtained (1101).

It is then checked whether there is an object at a designated position (1102). Using the coordinate data 114 and 115 of the REF_OBJ 102 and the display width 116 of FIG. 11, the name of the appropriate object and its segno number 117 are obtained.

As a result, if there is the appropriate object, its segno number is designated and the displayed color is changed (1105), the OBJ_TBL 71 and LINK_TBL 72 of FIG. 8 are retrieved from object names, and the results are displayed (1106).

If there is no appropriate object, it is checked whether there is a link at a designated position (1103). The coordinate data 120 of REF_LINK 103, i.e., the distance between the designated position and the link segment is calculated and if the distance calculated indicates that the designated position is on the line, the displayed color of the line segment is changed (1107), the LINK_TBL 72 and DEST_TBL 73 are retrieved from the names of the links and the results are displayed (1108).

If there are neither objects nor links at the designated position, it is reported that there are no appropriate objects and links (1104).

Thus, the display data is calculated and referred to, the entire structure of the respective program data is displayed using a graph structure, and the data on the programs related by the object or link at the designated position can be displayed.

We claim:

1. A method of reusing preexisting software source programs for use with a program support system including an input unit for inputting data into the system, a first memory containing a plurality of said preexisting software source programs, a second memory containing technique data associating said plurality of preexisting software source programs with programming techniques belonging to programming languages comprising systematic procedures by which each program task is accomplished, a third memory containing intention data associating said plurality of preexisting software source programs with objects comprising functional goals for which said plurality of preexisting software source programs were developed, a fourth memory containing relation data arranged in relation data tables, the relation data representing logical relatedness between said software source programs, said technique data and said intention data, a display unit and a central processing unit connecting said input unit, first memory, second memory, third memory and display unit, the method comprising the steps of:

inputting, from a system user, a keyword into said input unit of the program support system, the keyword representing a desired function to be performed by executing a desired new software source program;

searching said second memory to locate and retrieve first technique data matching said inputted keyword;

searching said third memory to locate and retrieve first intention data matching said inputted keyword;

retrieving, by referring to said relation data in the relation data tables of said fourth memory, a first preexisting software source program from said first memory based upon said first technique data and said first intention data located and retrieved;

displaying the retrieved first preexisting software source code program on said display unit;

selectively inputting from the system user predetermined test case input data for execution in conjunction with said retrieved first preexisting software source code program by the central processing unit;

executing said retired first preexisting software source code program using said test case input data;

displaying the result of said execution on said display unit.

2. The method of reusing preexisting software source programs according to claim 1 further comprising the steps of:

inputting, from the system user, a second keyword into said input unit of the program support system, the system keyword representing said desired function;

searching said second memory to locate and retrieve second technique data associated with said second inputted keyword;

retrieving, by referring to said relation data in the relation data tables of said fourth memory, a second preexisting software source program from said first memory based upon said second technique data located and retrieved; and, displaying the retrieved second preexisting software source code program on said display unit.

3. The method of reusing preexisting software source programs according to claim 2 further comprising the steps of:

selectively inputting from the system user second predetermined test case input data for execution in conjunction with said retrieved second preexisting software source code program by said central processing unit;

executing said retrieved second preexisting software source code program using said second test case input data; and, displaying the result of said execution on said display unit.

4. The method of reusing preexisting software source programs according to claim 2 further comprising the steps of:

selectively editing said retrieved second preexisting software source code program to generate a modified source code program;

selectively inputting from the system user second predetermined test case input data for execution in conjunction with said modified source code program by said central processing unit;

executing said modified preexisting software source code program using said second test case input data; and, displaying the result of said execution on said display unit.

5. A method of software development support for use with a program reuse support system including an input unit for inputting a command into the system from a system user, a display unit for visual interaction with the system user, a dialogue control system for controlling a dialogue between the user and the system, a command interpretation and execution unit for interpreting and executing the command inputted into the system and a memory for storing data related to a plurality of preexisting software source programs in a plurality of tables including:
- a source code correspondence table having a source code name column storing source code names of the plurality of preexisting software source programs and a source code identification number column storing identification numbers corresponding to the plurality of preexisting software source programs;
- a technique correspondence table having a technique name column storing names of programming techniques belonging to programming languages and used in development of the plurality of preexisting software source programs and a technique identification number column storing identification numbers corresponding to the names of the techniques used in development of the plurality of preexisting software source programs;
- an intention correspondence table having an intention name column storing keywords representing functions performed by the plurality of preexisting software source programs and an intention identification number column storing identification numbers corresponding to said keywords; and,
- a program library table storing said plurality of preexisting software source programs, the method comprising the steps of:

inputting the command from the system user into said input unit of the program support system;

receiving the inputted command into the dialogue control system and transferring the command to said command interpretation and execution unit as a sorted command, the sorted command comprising said inputted command grouped into a plurality of data fields including i) a selected data field holding selected data indicative of a start point from which a pointer is to be traversed, ii) a kind of data flag indicative of the selected data in the selected data field as being either source code, technique data or intention data and iii) a kind of pointer to be traversed data field indicative of which type of pointer set in the selected data is to be traversed;

selectively searching said source code correspondence table when said kind of data flag indicates the selected data field as being source code to find a match between a name in said inputted command and a name registered in said source code correspondence table and to determine a first correspondence between a first source code name stored in the source code correspondence table and the selected data;

selectively searching said technique correspondence table when said kind of data flag indicates the selected data field as being technique data to find a match between a name in said inputted command and a name registered in said technique correspondence table and to determine a second correspondence between a first technique name stored in the technique correspondence table and the selected data;

selectively searching said intention correspondence table when said kind of data flag indicates the selected data field as being intention data to find a match between a name in said inputted command and a name registered in said intention correspondence table and to determine a third correspondence between a first intention name stored in the intention correspondence table and the selected data; and, displaying, on the display unit, a message indicative of said selected data being unrelated to said data related to the plurality of preexisting software source programs in the plurality of tables when neither of the first correspondence, the second correspondence and the third correspondence are determined.

6. The method of software support according to claim 5 for use with a program support system further including in said memory an identification number correspondence table having a source code name column storing the source code names of the plurality of preexisting software source programs, a technique identification number column storing associated technique identification numbers corresponding to the plurality of preexisting software source programs and an intention identification number column storing associated intention identification numbers corresponding to said keywords representing the functions of the plurality of preexisting software source programs, said identification number correspondence table representing a logical correspondence defined by said system user between said source code names, technique identification numbers and intention identification numbers, the method further comprising the steps of:
- reading a first source code identification number associated with said first source code name from the source code correspondence table when said first correspondence is determined;
- reading said identification number correspondence table to selectively retrieve a one of a first technique identification number associated with said first source code identification number or a first intention identification number associated with said first source code identification number, based upon said kind of pointer to be traversed data field of said inputted command;
- selectively retrieving a first technique name corresponding to the first technique identification number from the technique correspondence table when said first technique identification number is retrieved based upon said kind of pointer to be traversed data field of said inputted command;
- selectively retrieving a first intention name corresponding to the first intention identification number from the intention correspondence table when said first intention identification number is retrieved based upon said kind of pointer to be traversed data field of said inputted command; and,
- displaying on the display unit a one of the first technique name and the first intention name selectively retrieved based upon said kind of pointer to be traversed data field of said inputted command.

7. The method of software support according to claim 5 for use with a program support system further including in said memory an identification number correspondence table having a technique name column storing the technique names of the plurality of preexisting software source programs, a source code identification number column storing associated source code identification numbers corresponding to the plurality of preexisting software source programs and an intention identification number column storing associated intention identification numbers corresponding to said keywords representing the functions of the plurality of preexisting software source programs, said identification number correspondence table representing a logical correspondence defined by said system user between said source code names, technique identification numbers and intention identification numbers, the method further comprising the steps of:

reading a first technique identification number associated with said first technique name from the technique correspondence table when said second correspondence is determined;

reading said identification number correspondence table to selectively retrieve a one of a first source code identification number associated with said first technique identification number or a first intention identification number associated with said first technique identification number, based upon said kind of pointer to be traversed data field of said inputted command;

selectively retrieving a source code name corresponding to the first source code identification number from the source code correspondence table when said first source code identification number is retrieved based upon said kind of pointer to be traversed data field of said inputted command;

selectively retrieving a first intention name corresponding to the first intention identification number from the intention correspondence table when said first intention identification number is retrieved based upon said kind of pointer to be traversed data field of said inputted command; and, displaying on the display unit a one of the first source code name and the first intention name selectively retrieved based upon said kind of pointer to be traversed data field of said inputted command.

8. The method of software support according to claim 7 for use with a program support system further including in said memory a technique class table having a first technique number column storing a first set of technique numbers of the plurality of preexisting software source programs and a second technique number column storing a second set of technique numbers logically related to the first set of technique numbers stored in said first column, the method further comprising the steps of:

reading said technique class table based on said first technique identification number to retrieve a second and logically related technique identification number;

reading said identification number correspondence table to selectively retrieve a one of a first source code identification number associated with said second technique identification number or a first intention identification number associated with said second technique identification number, based upon said kind of pointer to be traversed data field of said inputted command;

selectively retrieving a source code name corresponding to the first source code identification number from the source code correspondence table when said first source code identification number is retrieved based upon said kind of pointer to be traversed data field of said inputted command;

selectively retrieving a first intention name corresponding to the first intention identification number from the intention correspondence table when said first intention identification number is retrieved based upon said kind of pointer to be traversed data field of said inputted command; and, displaying on the display unit a one of the first source code name and the first intention name selectively retrieved based upon said kind of pointer to be traversed data field of said inputted command.

9. The method of software support according to claim 8 further comprising the steps of:

selectively retrieving from the program library table a preexisting source code program corresponding to the first source code identification number; and, displaying the retrieved source code program on the display unit.

10. The method of software support according to claim 7 further comprising the steps of:

selectively retrieving from the program library table a preexisting source code program corresponding to the first source code identification number; and, displaying the retrieved source code program on the display unit.

11. The method of software support according to claim 5 for use with a program support system further including in said memory an identification number correspondence table having an intention name column storing said keywords representing the functions of the plurality of preexisting software source programs, a source code identification number column storing associated source code identification numbers corresponding to the plurality of preexisting software source programs and a technique identification number column storing associated intention identification numbers corresponding to the descriptions of the intentions behind the development of the plurality of preexisting software source programs, said identification number correspondence table representing a logical correspondence defined by said system user between said source code names, technique identification numbers and intention identification numbers, the method further comprising the steps of:

reading a first intention identification number associated with said first intention name from the intention correspondence table when said third correspondence is determined;

reading said identification number correspondence table to selectively retrieve a one of a first source code identification number associated with said first intention identification number or a first technique identification number associated with said first intention identification number, based upon said kind of pointer to be traversed data field of said inputted command;

selectively retrieving a source code name corresponding to the first source code identification number from the source code correspondence table when said first source code identification number is retrieved based upon said kind of pointer to be traversed data field of said inputted command;

selectively retrieving a first technique name corresponding to the first technique identification number from the technique correspondence table when said first technique identification number is retrieved based upon said kind of pointer to be traversed data field of said inputted command; and, displaying on the display unit a one of the first source code name and the first technique name selectively retrieved based upon said kind of pointer to be traversed data field of said inputted command.

12. The method of software support according to claim 11 for use with a program support system further including in said memory an intention class table having a first intention number column storing a first set of intention numbers of the plurality of preexisting software source programs and a second intention number column storing a second set of intention numbers logically associated with the first set of intention numbers stored in said first column, the method further comprising the steps of:
- reading said intention class table based on said first intention identification number to retrieve a second and logically related intention identification number;
- reading said identification number correspondence table to selectively retrieve a one of a first source code identification number associated with said second intention identification number or a first technique identification number associated with said second intention identification number, based upon said kind of pointer to be traversed data field of said inputted command;
- selectively retrieving a source code name corresponding to the first source code identification number from the source code correspondence table when said first source code identification number is retrieved based upon said kind of pointer to be traversed data field of said inputted command;
- selectively retrieving a first technique name corresponding to the second intention identification number from the intention correspondence table when said second intention identification number is retrieved based upon said kind of pointer to be traversed data field of said inputted command; and,
- displaying on the display unit a one of the first source code name and the first technique name selectively retrieved based upon said kind of pointer to be traversed data field of said inputted command.

13. The method of software support according to claim 12 further comprising the steps of:
- selectively retrieving from the program library table a preexisting source code program corresponding to the first source code identification number; and,
- displaying the retrieved source code program on the display unit.

14. The method of software support according to claim 11 further comprising the steps of:
- selectively retrieving from the program library table a preexisting source code program corresponding to the first source code identification number; and,
- displaying the retrieved source code program on the display unit.

15. A method of reusing preexisting software source programs for use with a program support system including an input unit for inputting data into the system, a first memory containing a plurality of said preexisting software source programs, a second memory containing technique data associating said plurality of preexisting software source programs with programming techniques comprising systematic procedures by which each program task of said plurality of preexisting software source programs is accomplished, a third memory containing intention data associating said plurality of preexisting software source programs with objects comprising functional goals for which each of said preexisting software source programs was developed, a display unit and a central processing unit connecting said input unit, first memory, second memory, third memory and display unit, the method comprising the steps of:
- inputting, from a system user into said input unit of the program support system, a first key phrase comprising at least one first keyword, the first key phrase representing a desired systematic procedure by which a desired new software source program task is to be accomplished;
- searching said second memory to locate and retrieve first technique data corresponding to said inputted first key phrase;
- inputting, from said system user into said input unit of the program support system, a second key phrase comprising at least one second keyword, the second key phrase representing a desired functional goal for which said desired new software source program is to be developed;
- searching said third memory to locate and retrieve first intention data corresponding to said inputted second key phrase;
- retrieving a first preexisting software source program from said first memory based upon said first technique data located and retrieved and said first intention data located and retrieved;
- displaying the retrieved first preexisting software source code program on said display unit;
- selectively inputting from said system user predetermined test case input data for execution in conjunction with said retrieved first preexisting software source code program by the central processing unit;
- executing said retrieved first preexisting software source code program using said test case input data; and,
- displaying the result of said execution on said display unit.

16. The method of reusing preexisting software source programs according to claim 15 further comprising the steps of:
- inputting from the system user into said input unit of the program support system a third key phrase comprising at least one third keyword, the third key phrase representing said desired systematic procedure by which said new software source program task is to be accomplished;
- searching said second memory to locate and retrieve second technique data corresponding to said third inputted key phrase;
- retrieving a second preexisting software source program from said first memory based upon said second technique data located and retrieved; and,
- displaying the retrieved second preexisting software source code program on said display unit.

17. The method of reusing preexisting software source programs according to claim 15 further comprising the steps of:
- selectively inputting from said system user second predetermined test case input data for execution in conjunction with said retrieved second preexisting software source code program by said central processing unit;
- executing said retrieved second preexisting software source code program using said second test case input data; and,
- displaying the result of said execution on said display unit.

18. The method of reusing preexisting software source programs according to claim 15 further comprising the steps of:
- selectively editing said retrieved second preexisting software source code program to generate a modified source code program;
- selectively inputting from said system user second predetermined test case input data for execution in conjunction with the modified source code program by said central processing unit;
- executing said modified preexisting software source code program using said second test case input data; and,
- displaying the result of said execution on said display unit.

* * * * *

UNITED STATES PATENT AND TRADEMARK OFFICE
CERTIFICATE OF CORRECTION

PATENT NO. : 5,261,100

DATED : November 9, 1993

INVENTOR(S) : Tsutomu Fujinami, et al.

It is certified that error appears in the above-identified patent and that said Letters Patent is hereby corrected as shown below:

Claim 1, column 22, line 13, delete "retired" and substitute therefor --retrieved--.

Signed and Sealed this

Twelfth Day of April, 1994

Attest:

BRUCE LEHMAN

Attesting Officer    Commissioner of Patents and Trademarks